US012706071B2

(12) United States Patent

Xu et al.

(10) Patent No.: US 12,706,071 B2

(45) Date of Patent: Aug. 11, 2026

(54) TIMING CONTROLLER AND WORKING METHOD THEREOF, DISPLAY MODULE, AND ELECTRONIC DEVICE

(71) Applicant: HUAWEI TECHNOLOGIES CO., LTD., Shenzhen (CN)

(72) Inventors: Junwen Xu, Shenzhen (CN); Yan Li, Nanjing (CN); Chunlei Guo, Shenzhen (CN); Shuxiong Ou, Shenzhen (CN); Jun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/206,983

(22) Filed: May 13, 2025

(65) Prior Publication Data

US 2025/0273184 A1 Aug. 28, 2025

Related U.S. Application Data

(63) Continuation of application No. PCT/CN2023/103250, filed on Jun. 28, 2023.

(30) Foreign Application Priority Data

Nov. 14, 2022 (CN) ......................... 202211427292.8
Dec. 29, 2022 (CN) ......................... 202211717073.3

(51) Int. Cl.
*G09G 5/18* (2006.01)

(52) U.S. Cl.
CPC ........... *G09G 5/18* (2013.01); *G09G 2310/08* (2013.01); *G09G 2320/046* (2013.01)

(58) Field of Classification Search
CPC . G09G 5/18; G09G 2310/08; G09G 2320/046
See application file for complete search history.

(56) References Cited

U.S. PATENT DOCUMENTS 10,950,195 B1 * 3/2021 He ........................... G09G 3/36
11,854,497 B2 * 12/2023 Chang .................. G09G 3/3266
(Continued)

FOREIGN PATENT DOCUMENTS

CN 105788551 A 7/2016
CN 107863058 A 3/2018
(Continued)

OTHER PUBLICATIONS

Hisilicon, "HiSilicon Display Chipsets Enable the Large-Screen Display Market to Flourish", downloaded from the Internet at: https://www.hisilicon.com/cn/about-us/press/news/large-screen-display-market, total 30 pages (Apr. 26, 2020).

*Primary Examiner* — Peter D McLoone

(74) *Attorney, Agent, or Firm* — Leydig, Voit & Mayer, Ltd.

(57) ABSTRACT

A timing controller and a working method thereof, a display module, and an electronic device relate to the field of electronic technologies, and are used for optimizing performance of the timing controller. The timing controller (TCON) includes a first non-volatile memory (NVM1). The NVM1 is configured to store data for working of the timing controller (TCON), such as software code for starting the TCON, firmware parameter information, data for demura correction, data for anti-burn-in correction, and data for overdriving compensation. A processor, a demura correction circuit, an anti-burn-in correction circuit, an overdrive circuit, and another circuit included in the TCON directly retrieve the data for working from the NVM1.

15 Claims, 13 Drawing Sheets

(56) References Cited

U.S. PATENT DOCUMENTS

| | | | | |
|---|---|---|---|---|
| 2014/0285540 | A1 | 9/2014 | Wu | |
| 2021/0049969 | A1* | 2/2021 | Wang | G09G 3/3688 |
| 2021/0065641 | A1* | 3/2021 | He | G09G 3/3655 |
| 2023/0252946 | A1* | 8/2023 | Chang | G06N 3/09 345/204 |
| 2025/0234705 | A1* | 7/2025 | Lv | H10K 59/1213 |

FOREIGN PATENT DOCUMENTS

| | | | |
|---|---|---|---|
| CN | 110176218 | A | 8/2019 |
| CN | 111554236 | A | 8/2020 |
| CN | 111816140 | B | 1/2022 |
| CN | 114255712 | A | 3/2022 |
| CN | 114360461 | A | 4/2022 |
| WO | 2021261859 | A1 | 12/2021 |

* cited by examiner

TIMING CONTROLLER AND WORKING METHOD THEREOF, DISPLAY MODULE, AND ELECTRONIC DEVICE

CROSS-REFERENCE TO RELATED APPLICATIONS

This application is a continuation of International Application No. PCT/CN2023/103250, filed on Jun. 28, 2023, which claims priority to Chinese Patent Application No. 202211427292.8, filed on Nov. 14, 2022, and Chinese Patent Application No. 202211717073.3, filed on Dec. 29, 2022. All of the aforementioned patent applications are hereby incorporated by reference in their entireties.

TECHNICAL FIELD

This application relates to the field of electronic technologies, and in particular, to a timing controller and a working method thereof, a display module, and an electronic device.

BACKGROUND

With development of display technologies, users have increasingly high requirements on costs, integration, performance, reliability, and the like of electronic devices.

A timing controller (TCON) in an electronic device is configured to provide a timing control signal for display on the electronic device, and is responsible for data format conversion and critical image quality processing. Performance of the timing controller has direct impact on image display quality of the electronic device and reliability of the electronic device.

SUMMARY

Embodiments of this application provide a timing controller and a working method thereof, a display module, and an electronic device, to optimize performance of the timing controller.

To achieve the foregoing objective, this application uses the following technical solutions.

According to a first aspect of embodiments of this application, a timing controller is provided, and is configured to be used in a display panel. The timing controller includes a first non-volatile memory and a processor. The first non-volatile memory is configured to store software code for starting the timing controller, and the processor is configured to read the software code. The timing controller further includes, for example, a demura correction circuit, an anti-burn-in correction circuit, and a timing control circuit. The demura correction circuit is configured to: perform demura correction processing on a received signal and output a processed signal. The anti-burn-in correction circuit is configured to: perform anti-burn-in correction processing on a received signal and output a processed signal. The timing control circuit is configured to: process a received signal and output a timing control signal.

The first non-volatile memory is internally integrated into the timing controller provided in embodiments of this application. The software code for starting the timing controller is directly stored in the first non-volatile memory, and is no longer stored in an external non-volatile memory. In this way, when the timing controller is started, the processor may directly retrieve the software code from the first non-volatile memory, without a loading process from the external non-volatile memory to an internal volatile memory. The timing controller has a fast startup speed and a simple working procedure, which can reduce a delay of the timing controller. In addition, because of on-chip integration and non-volatile characteristics, the first non-volatile memory replaces an on-chip volatile memory and the external non-volatile memory in a conventional timing controller, to simplify an architecture of the timing controller, and reduce an area of the timing controller. Moreover, because the memory integrated into the timing controller is the first non-volatile memory, when data is maintained, the first non-volatile memory can maintain the data without requiring power supply. In comparison with a case in which power needs to be supplied to a conventional volatile memory to maintain data, the timing controller provided in embodiments of this application can greatly reduce power consumption of the timing controller.

In a possible implementation, the first non-volatile memory is further configured to store a firmware parameter representing identity information of the timing controller, and the processor is further configured to read and/or write the firmware parameter. The on-chip first non-volatile memory may implement functions of the volatile memory, a one-time programmable memory, and the external non-volatile memory. This unifies types of memories used in the timing controller, and improves compatibility between memories. In addition, the first non-volatile memory may directly store the firmware parameter without external retrieving. This reduces a delay of the timing controller.

In a possible implementation, the processor is directly coupled to the first non-volatile memory. In this way, a circuit structure of the timing controller is simple.

In a possible implementation, the first non-volatile memory is further configured to store demura correction data, and the demura correction circuit is configured to: process the received signal based on the demura correction data read from the first non-volatile memory, and output the processed signal. In this way, when the timing controller works, the demura correction circuit may directly read corresponding data from the first non-volatile memory. This reduces a delay of the timing controller.

In a possible implementation, the demura correction circuit is coupled to the first non-volatile memory. In this way, a circuit structure of the timing controller is simple.

In a possible implementation, the first non-volatile memory is further configured to store anti-burn-in correction data, and the anti-burn-in correction circuit is configured to: perform anti-burn-in correction processing on the received signal based on the anti-burn-in correction data read from the first non-volatile memory, output the processed signal, and write updated anti-burn-in correction data into the first non-volatile memory. In this way, when the timing controller works, the anti-burn-in correction circuit may directly read corresponding data from the first non-volatile memory. This reduces a delay of the timing controller.

In a possible implementation, the anti-burn-in correction circuit is coupled to the first non-volatile memory. In this way, a circuit structure of the timing controller is simple.

In a possible implementation, the first non-volatile memory is further configured to buffer video data input from the outside. The first non-volatile memory may be directly used as an input buffer circuit. This reduces types of memories in the timing controller and improves compatibility between memories.

In a possible implementation, the first non-volatile memory is further configured to buffer a timing control signal output to the outside. The first non-volatile memory may be directly used as an output buffer circuit. This reduces types of memories in the timing controller and improves compatibility between memories.

In a possible implementation, the timing controller further includes a gamma correction circuit, the first non-volatile memory is further configured to store data for gamma correction, and the gamma correction circuit is configured to: process a received signal based on the gamma correction data read from the first non-volatile memory and output a processed signal. In this way, when the timing controller works, the gamma correction circuit may directly read corresponding data from the first non-volatile memory. This reduces a delay of the timing controller.

In a possible implementation, the gamma correction circuit is coupled to the first non-volatile memory. In this way, a circuit structure of the timing controller is simple.

In a possible implementation, the timing controller further includes a viewing angle compensation circuit, the first non-volatile memory is further configured to store data for viewing angle compensation, and the viewing angle compensation circuit is configured to: process a received signal based on the viewing angle compensation data read from the first non-volatile memory and output a processed signal. In this way, when the timing controller works, the viewing angle compensation circuit may directly read corresponding data from the first non-volatile memory. This reduces a delay of the timing controller.

In a possible implementation, the viewing angle compensation circuit is coupled to the first non-volatile memory. In this way, a circuit structure of the timing controller is simple.

In a possible implementation, the timing controller further includes a row-level charging compensation circuit, the first non-volatile memory is further configured to store data for row-level charging compensation, and the row-level charging compensation circuit is configured to: process a received signal based on the row-level charging compensation data read from the first non-volatile memory and output a processed signal. In this way, when the timing controller works, the row-level charging compensation circuit may directly read corresponding data from the first non-volatile memory. This reduces a delay of the timing controller.

In a possible implementation, the row-level charging compensation circuit is coupled to the first non-volatile memory. In this way, a circuit structure of the timing controller is simple.

In a possible implementation, the timing controller further includes a jitter compensation circuit, the first non-volatile memory is further configured to store data for jitter compensation, and the jitter compensation circuit is configured to: process a received signal based on the jitter compensation data read from the first non-volatile memory and output a processed signal. In this way, when the timing controller works, the jitter compensation circuit may directly read corresponding data from the first non-volatile memory. This reduces a delay of the timing controller.

In a possible implementation, the jitter compensation circuit is coupled to the first non-volatile memory. In this way, a circuit structure of the timing controller is simple.

In a possible implementation, the timing controller further includes an overdrive (overdrive) circuit, the first non-volatile memory is further configured to store overdrive data, and the overdrive circuit is configured to: write a received signal into the first non-volatile memory, read the overdrive data, process the overdrive data, and output processed overdrive data. In this way, the overdrive data is stored in the first non-volatile memory, and does not need to be stored in the volatile memory. Each storage unit in the on-chip volatile memory usually needs to include six transistors, and each storage unit in the first non-volatile memory may include only one transistor. Therefore, using the first non-volatile memory to store the overdrive data can reduce an area of the timing controller.

In a possible implementation, the overdrive circuit is coupled to the first non-volatile memory. In this way, a circuit structure of the timing controller is simple.

In a possible implementation, the first non-volatile memory and the processor are integrated into a same bare die. In this case, the first non-volatile memory is an on-chip non-volatile memory.

In a possible implementation, the first non-volatile memory and the processor are separately disposed in two bare dies. In this case, the first non-volatile memory is an off-chip non-volatile memory, but may be co-packaged in a same chip with a functional circuit in the timing controller.

In a possible implementation, the first non-volatile memory includes a first control circuit and a first storage array, and the first control circuit is coupled to the first storage array and is configured to control reading of the first storage array. This is an implementation with a simple structure.

In a possible implementation, the timing controller further includes an input/output interface, and the input/output interface is coupled to the first non-volatile memory and is configured to perform writing or reading with the outside of the timing controller. In this way, data stored by an external memory may be transmitted to the first non-volatile memory through the input/output interface, to meet different requirements.

In a possible implementation, the first non-volatile memory includes one or more of a flash memory, a magnetoresistive random access memory, a resistive random access memory, a phase-change random access memory, and a ferroelectric memory. This is an implementation with a simple structure.

According to a second aspect of embodiments of this application, a display module is provided, including a display panel and a timing controller. The timing controller is configured to provide a timing control signal for the display panel, and the timing controller includes the timing controller according to any one item in the first aspect.

The display module provided in embodiments of this application includes the timing controller in the first aspect, and beneficial effects thereof are the same as beneficial effects of the timing controller. Details are not described herein again.

In a possible implementation, the display module further includes a second non-volatile memory, and the second non-volatile memory is coupled to the timing controller. In this way, the timing controller may be further connected to the second non-volatile memory that is external, to meet different requirements.

According to a third aspect of embodiments of this application, an electronic device is provided, including a display module and a housing. The display module is disposed in the housing, and the display module includes the display module in the second aspect.

According to a fourth aspect of embodiments of this application, a timing controller assembly is provided, and is configured to: be used in a display panel, and provide a timing control signal for driving the display panel. The timing controller assembly includes a timing controller and a third non-volatile memory. The third non-volatile memory is disposed outside the timing controller. The timing controller includes a processor, and the processor is directly coupled to the third non-volatile memory.

According to the timing controller assembly provided in embodiments of this application, a volatile memory that is in the timing controller and that is configured to store data for working of the timing controller, such as software code for starting the timing controller, data for demura correction, data for anti-burn-in correction, and data for overdriving, is replaced with the third non-volatile memory in embodiments of this application. This can reduce an area ratio of the timing controller. In addition, a storage function required by the timing controller is provided by the third non-volatile memory. When data is maintained, the third non-volatile memory can maintain the data without requiring power supply. This can greatly reduce power consumption of the timing controller assembly. Moreover, because data required by the timing controller is stored in the third non-volatile memory, when the timing controller works, each circuit may directly read corresponding data from the third non-volatile memory. This can optimize a system architecture, and reduce a delay of the timing controller.

In a possible implementation, the timing controller and the third non-volatile memory are two independent chips. This is a possible structure.

In a possible implementation, the timing controller further includes a functional circuit, the functional circuit is configured to implement a function of the timing controller, and the functional circuit is directly coupled to the third non-volatile memory. All functional circuits in the timing controller are coupled to the third non-volatile memory, and no memory needs to be disposed in the timing controller. This can simplify a structure of the timing controller, and reduce an area of the timing controller.

According to a fifth aspect of embodiments of this application, a working method of a timing controller is provided. The timing controller is configured to be used in a display panel, and the timing controller includes a processor and a non-volatile memory. The working method includes: At a power-on and startup period, the processor directly reads, from the non-volatile memory, software code for starting the timing controller.

According to the working method of the timing controller in embodiments of this application, in a power-on and startup process, the timing controller directly retrieves the software code from the internal non-volatile memory of the timing controller, without loading the software code from an external non-volatile memory to the internal non-volatile memory. The timing controller has a fast startup speed and a simple working procedure, which can reduce a delay of the timing controller.

In a possible implementation, at the power-on and startup period, the processor is further configured to directly read, from the non-volatile memory, a firmware parameter representing identity information of the timing controller. In the power-on and startup process, the timing controller directly retrieves the firmware parameter from the internal non-volatile memory of the timing controller, without loading the firmware parameter from the external non-volatile memory to the internal non-volatile memory. The timing controller has a fast startup speed and a simple working procedure, which can reduce a delay of the timing controller.

In a possible implementation, the timing controller further includes a gamma correction circuit; and the working method further includes: After the timing controller is started, at a gamma correction period, the gamma correction circuit receives a signal, directly reads gamma correction data from the non-volatile memory, and performs gamma correction on the received signal. After the timing controller is powered on and started, if gamma correction needs to be performed on the received signal, the gamma correction data is directly read from the non-volatile memory, without loading the gamma correction data from the external non-volatile memory to the internal non-volatile memory. A working procedure of the timing controller is simple, and a response speed is fast.

In a possible implementation, the timing controller further includes a demura correction circuit; and the working method further includes: After the timing controller is started, at a demura correction period, the demura correction circuit receives a signal, directly reads demura correction data from the non-volatile memory, and performs demura correction on the received signal. After the timing controller is powered on and started, if demura correction needs to be performed on the received signal, the demura correction data is directly read from the non-volatile memory, without loading the demura correction data from the external non-volatile memory to the internal non-volatile memory. A working procedure of the timing controller is simple, and a response speed is fast.

In a possible implementation, the timing controller further includes an overdrive circuit; and the working method further includes: After the timing controller is started, at an overdrive compensation period, the overdrive circuit receives a signal, writes the received signal into the non-volatile memory, directly reads overdrive data from the non-volatile memory, processes the overdrive data, and outputs processed overdrive data. After the timing controller is powered on and started, if overdrive compensation needs to be performed on the received signal, the overdrive data is directly read from the non-volatile memory, without loading the overdrive data from the external non-volatile memory to the internal non-volatile memory. A working procedure of the timing controller is simple, and a response speed is fast.

In a possible implementation, the timing controller further includes an anti-burn-in correction circuit; and the working method further includes: After the timing controller is started, at an anti-burn-in correction period, the anti-burn-in correction circuit receives a signal, directly reads anti-burn-in correction data from the non-volatile memory, and performs anti-burn-in correction on the received signal. After the timing controller is powered on and started, if anti-burn-in correction needs to be performed on the received signal, the anti-burn-in correction data is directly read from the non-volatile memory, without loading the anti-burn-in correction data from the external non-volatile memory to the internal non-volatile memory. A working procedure of the timing controller is simple, and a response speed is fast.

In a possible implementation, the timing controller further includes a viewing angle compensation circuit; and the working method further includes: After the timing controller is started, at a viewing angle compensation period, the viewing angle compensation circuit receives a signal, directly reads viewing angle compensation data from the non-volatile memory, and performs viewing angle compensation on the received signal. After the timing controller is powered on and started, if viewing angle compensation needs to be performed on the received signal, the viewing angle compensation data is directly read from the non-volatile memory, without loading the viewing angle compensation data from the external non-volatile memory to the internal non-volatile memory. A working procedure of the timing controller is simple, and a response speed is fast.

In a possible implementation, the timing controller further includes a row-level charging compensation circuit; and the working method further includes: After the timing controller is started, at a row-level charging compensation period, the row-level charging compensation circuit receives a signal, directly reads row-level charging compensation data from the non-volatile memory, and performs row-level charging compensation on the received signal. After the timing controller is powered on and started, if row-level charging compensation needs to be performed on the received signal, the row-level charging compensation data is directly read from the non-volatile memory, without loading the row-level charging compensation data from the external non-volatile memory to the internal non-volatile memory. A working procedure of the timing controller is simple, and a response speed is fast.

In a possible implementation, the timing controller further includes a jitter compensation circuit; and the working method further includes: After the timing controller is started, at a jitter compensation period, the jitter compensation circuit receives a signal, directly reads jitter compensation data from the non-volatile memory, and performs jitter compensation on the received signal. After the timing controller is powered on and started, if jitter compensation needs to be performed on the received signal, the jitter compensation data is directly read from the non-volatile memory, without loading the jitter compensation data from the external non-volatile memory to the internal non-volatile memory. A working procedure of the timing controller is simple, and a response speed is fast.

According to a sixth aspect of embodiments of this application, a timing controller is provided, including a non-volatile memory and a processor. The non-volatile memory is coupled to the processor.

In a possible implementation, the non-volatile memory includes at least one of a flash memory, a magnetoresistive random access memory, a resistive random access memory, a phase-change random access memory, and a ferroelectric memory.

In a possible implementation, the timing controller further includes a timing control circuit, and the timing control circuit and the non-volatile memory are integrated on a same wafer.

According to a seventh aspect of embodiments of this application, a chip is provided, including a driver and a timing controller. The timing controller is coupled to the driver, and the timing controller is the timing controller in the fifth aspect.

According to an eighth aspect of embodiments of this application, an electronic device is provided, including a display panel and a timing controller. The timing controller is configured to provide a timing control signal for the display panel, and the timing controller is the timing controller in the fifth aspect.

DESCRIPTION OF EMBODIMENTS

Figure 1A:
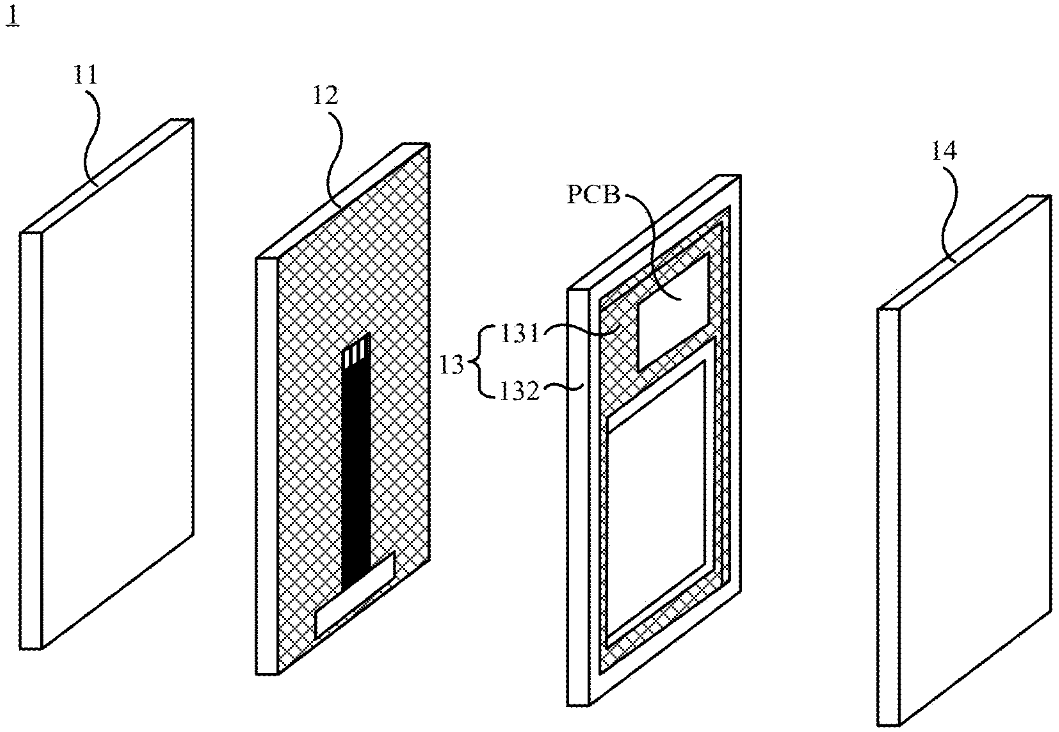
FIG. 1A is a diagram of a framework of an electronic device according to an embodiment of this application.

The following describes technical solutions in embodiments of this application with reference to the accompanying drawings in embodiments of this application. It is clear that the described embodiments are merely a part rather than all of embodiments of this application.

The terms such as "first" and "second" below are only for ease of description, and cannot be understood as indicating or implying relative importance or implicitly indicating a quantity of indicated technical features. Therefore, a feature limited by "first", "second", or the like may explicitly or implicitly include one or more features. In the descriptions of this application, unless otherwise stated, "a plurality of" means two or more than two.

In addition, in embodiments of this application, orientation terms such as "upper", "lower", "left", and "right" may include but are not limited to definitions based on illustrated orientations in which components in the accompanying drawings are placed. It should be understood that these directional terms may be relative concepts. They are used for description and clarification of relative positions, and may vary accordingly depending on a change in the orientations in which the components in the accompanying drawings are placed in the accompanying drawings.

In embodiments of this application, unless otherwise clearly specified and limited, a term "connection" should be understood in a broad sense. For example, the "connection" may be a fixed connection, a detachable connection, or an integrated connection, or may be a direct connection, or an indirect connection through an intermediate medium. In addition, the term "coupling" may be a direct electrical connection, or may be an indirect electrical connection through an intermediate medium. The term "contact" may be direct contact, or indirect contact through an intermediate medium.

In embodiments of this application, the term "and/or" describes an association relationship between associated objects and may indicate that three relationships exist. For example, A and/or B may indicate the following cases: Only A exists, both A and B exist, and only B exists, where A and B may be singular or plural. The character "/" generally indicates an "or" relationship between the associated objects.

An embodiment of this application provides an electronic device. The electronic device is, for example, a consumer electronic product, a home electronic product, a vehicle-mounted electronic product, a financial terminal product, or a communication electronic product, each of which has a touch function. The consumer electronic product is, for example, a mobile phone (mobile phone), a tablet computer (pad), a notebook computer, an e-reader, a personal computer (PC), a personal digital assistant (PDA), a desktop display, an intelligent wearable product (for example, a smart watch or a smart band), a virtual reality (VR) terminal device, an augmented reality (AR) terminal device, or an uncrewed aerial vehicle. The home electronic product is, for example, a smart door lock, a television, a remote control, a refrigerator, or a small household charging appliance (for example, a soy milk maker or a robot vacuum). The vehicle-mounted electronic product is, for example, a vehicle-mounted navigator or a vehicle-mounted high-density digital video disc (DVD). The financial terminal product is, for example, an automated teller machine (ATM) or a terminal for self-service business handling. The communication electronic product is, for example, a communication device such as a server, a non-volatile memory, a radar, or a base station.

For ease of description, the following uses an example in which the electronic device is a mobile phone for description. As shown in FIG. 1A, an electronic device 1 mainly includes a cover plate 11, a display panel 12, a middle frame 13, and a rear cover 14. The rear cover 14 and the display panel 12 are located on two sides of the middle frame 13 respectively, the middle frame 13 and the display panel 12 are disposed in the rear cover 14, the cover plate 11 is disposed on a side that is of the display panel 12 and that is away from the middle frame 13, and a display surface of the display panel 12 faces the cover plate 11. The cover plate 11 and the rear cover 14 are mated to form a housing of the electronic device.

The display panel 12 may be a liquid crystal display (LCD) panel. In this case, the liquid crystal display panel further includes a backlight module, and the backlight module is configured to provide a light source for the liquid crystal display panel. The display panel 12 may alternatively be an organic light-emitting diode (OLED) display panel. The OLED display panel is a self-emissive display panel, and therefore does not need to be provided with a backlight module. Certainly, the display panel 12 may be any panel that can implement a display function in a conventional technology. This is not limited in embodiments of this application.

The middle frame 13 includes a bearing plate 131 and a side frame 132 surrounding the bearing plate 131. The electronic device 1 may further include electronic components such as a printed circuit board (printed circuit board, PCB), a battery, and a camera. The electronic components such as the printed circuit board, the battery, and the camera may be disposed on the bearing plate 131.

For example, the display panel 12 is a liquid crystal display panel. As shown in FIG. 1*i*, the display panel 12 includes an active display area (AA) A and a peripheral area B around the active display area A.

In some embodiments, the active display area A of the display panel 12 is used as a display area of the electronic device 1, and the peripheral area B of the display panel 12 is used as a non-display area of the electronic device 1.

Figure 1B:
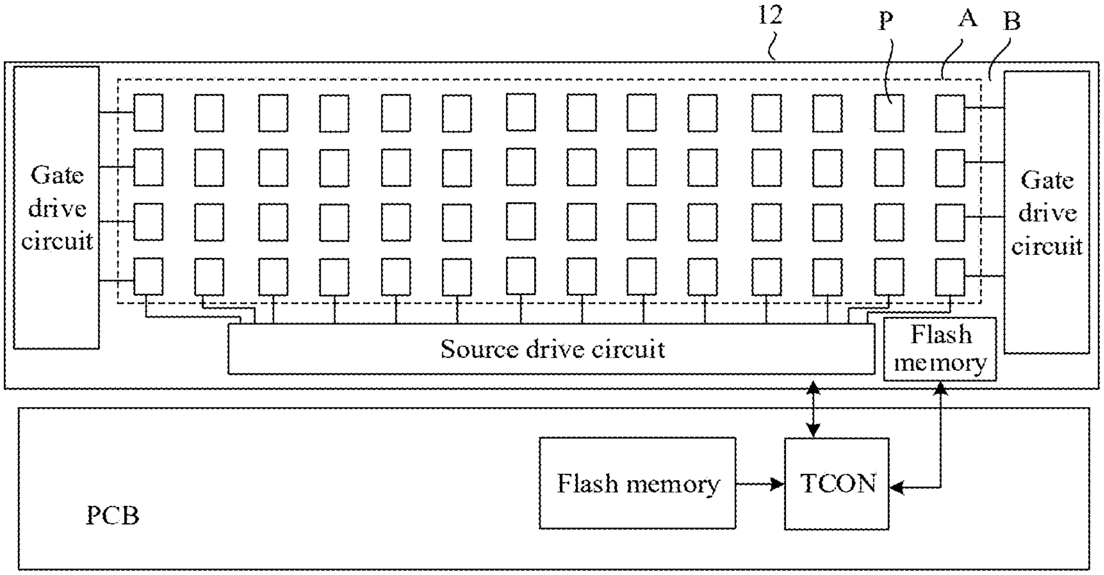
FIG. 1B is a diagram of a layout of an electronic device according to an embodiment of this application.

As shown in FIG. 1B, the active display area A of the display panel 12 includes a plurality of sub pixels (sub pixels) P. For ease of description, in this application, descriptions are provided by using an example in which the plurality of sub pixels P are arranged in a matrix. In this case, sub pixels P arranged in a line in a horizontal direction are referred to as sub pixels in a same row, and sub pixels P arranged in a line in a vertical direction are referred to as sub pixels in a same column.

The electronic device 1 includes a gate drive circuit (gate driver) and a source drive circuit (source driver) that are located in the peripheral area B of the display panel 12. The gate drive circuit is configured to provide a gate drive signal for a sub pixel P, and the source drive circuit is configured to provide a source drive signal for a sub pixel P.

For example, the gate drive circuit may be integrated into the display panel 12 by using a gate on array (GOA) technology or the like. The gate drive circuit includes a plurality of cascaded shift registers (SRs).

There may be one or more gate drive circuits. For example, as shown in FIG. 1B, the electronic device 1 includes two gate drive circuits, and the two gate drive circuits are disposed on two sides of the active display area A in the horizontal direction. The electronic device further includes a timing controller (TCON). The timing controller TCON is configured to provide a timing control signal for the gate drive circuit and the source drive circuit in the display panel 12.

In some embodiments, as shown in FIG. 1B, the timing controller TCON is located outside the display panel 12 and disposed on the PCB. The timing controller TCON is coupled to a flash memory disposed on the PCB and a flash memory disposed on the display panel 12. In a working process of the timing controller TCON, storage data needs to be retrieved from the two external flash memories.

Figure 2:
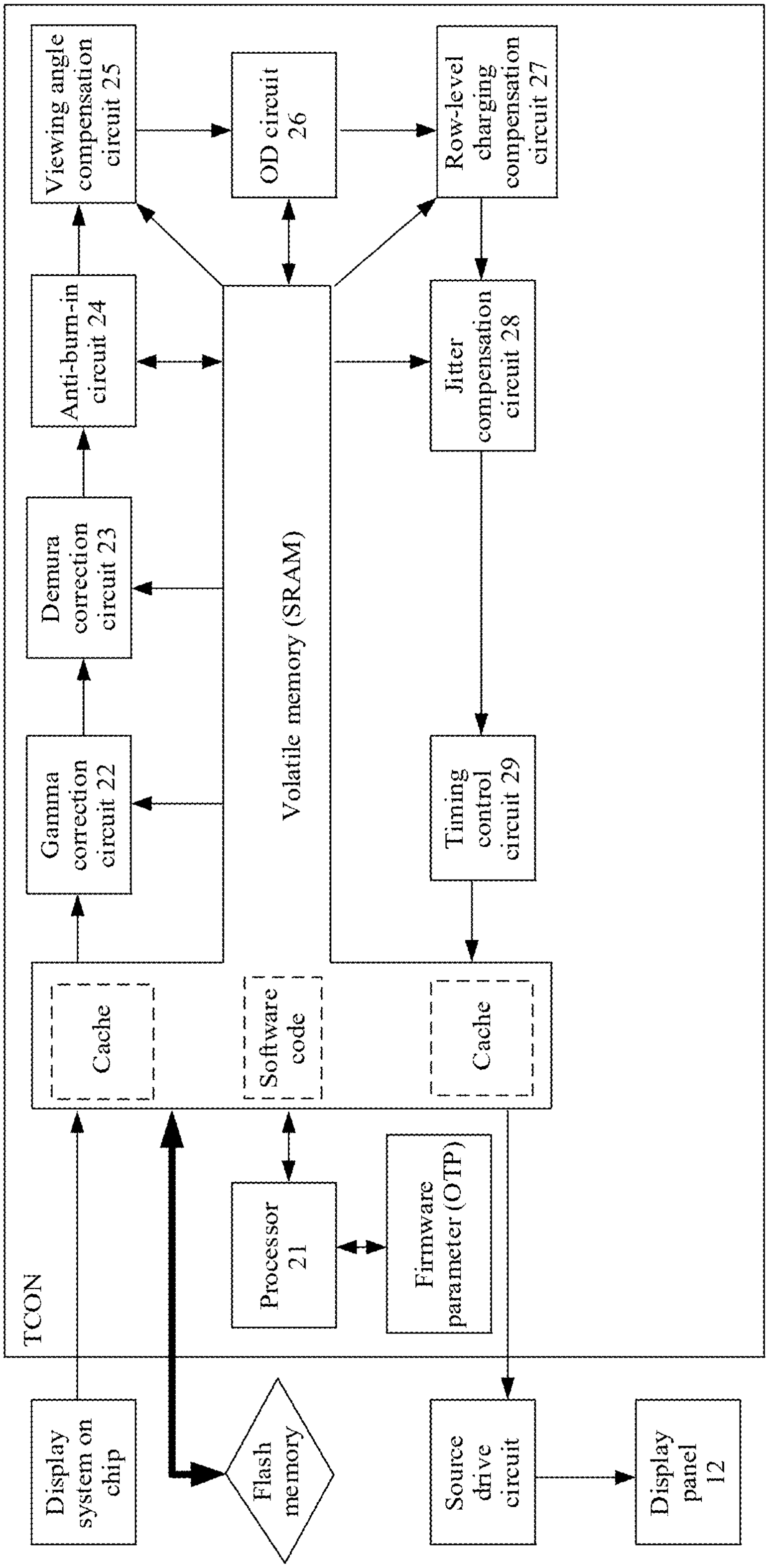
FIG. 2 is a diagram of an architecture of a timing controller and external components of the timing controller according to an embodiment of this application.

For a structure of the timing controller TCON, in some technologies, refer to FIG. 2, which shows a timing controller TCON. For example, the timing controller TCON includes a processor 21, a gamma (gamma) correction circuit 22, a demura (demura) correction circuit 23, an anti-burn-in correction circuit 24, a viewing angle compensation circuit 25, an overdrive (overdrive, OD) circuit 26, a row-level charging compensation circuit 27, a jitter compensation circuit 28, a timing control circuit 29, a one-time programmable memory (one-time programmable memory, OTP), and a volatile memory.

The processor 21, the overdrive (OD) circuit 26, the anti-burn-in correction circuit 24, the demura (demura) correction circuit 23, the gamma (gamma) correction circuit 22, the viewing angle compensation circuit 25, the row-level charging compensation circuit 27, and the jitter compensation circuit 28 are all coupled to the volatile memory. The volatile memory is also coupled to an external non-volatile memory (NVM). The timing controller TCON is coupled to an external display system on chip and the source drive circuit.

The timing controller TCON shown in FIG. 2 is used as an example. The timing controller TCON may be roughly divided into three parts.

A first part is a power-on process of the timing controller TCON. In this process, the processor 21 reads software code, so that the timing controller TCON enters a working state.

A second part is that the timing controller TCON receives a data stream decoded by a display system on chip (SoC), and outputs the data stream to the source drive circuit after a series of data processing, so that an image is finally displayed on the display panel 12.

A third part is to store information about some firmware parameters representing identity information of the timing controller TCON.

From a perspective of data storage, a storage function related to the timing controller TCON is provided by an internal volatile memory of the timing controller TCON and an external non-volatile memory NVM of the timing controller TCON.

According to whether a stored signal in information stored in a memory still exists after an external power supply of a chip is powered off, the memory may be classified into a volatile memory and a non-volatile memory.

The volatile memory may include, for example, a static random access memory (SRAM) or a dynamic random access memory (DRAM), and storage of information in the volatile memory requires continuous external power supply. When the external power is small, the stored information no longer exists. FIG. 2 shows an example in which the volatile memory included in the timing controller TCON is an SRAM.

For the non-volatile memory, information stored in the non-volatile memory is not lost in a case in which the external power supply is powered off. The non-volatile memory NVM in FIG. 2 may be, for example, a serial peripheral interface flash (SPI flash) memory.

In other words, from a perspective of data storage, the timing controller TCON relates to two parts of data storage. One part is an external flash memory outside the timing controller TCON. The external flash memory is a non-volatile memory, and is configured to store data that needs to be saved during power failure. The other part is the SRAM and the one-time programmable memory OTP inside the timing controller TCON, each of which is a volatile memory. The SRAM is responsible for reading data from the flash memory, participates in data processing, and functions as a cache. The one-time programmable memory OTP is configured to store a firmware parameter. The one-time programmable memory OTP may be, for example, an electronic fuse (eFuse) or an anti-electronic fuse (antifuse).

Although the timing controller TCON shown in FIG. 2 may provide a timing control signal used for display on the display panel 12, the volatile memory (for example, the SRAM) is integrated into the timing controller TCON, and an area of the timing controller TCON is increased when the SRAM with a large capacity performs on-chip storage. In addition, the timing controller TCON needs to be additionally connected to the external non-volatile memory (for example, the flash memory), configured to store data (for example, software code for starting the timing controller TCON, demura correction data, and anti-burn-in correction data) when the timing controller TCON is powered off. A structure is complex. Moreover, the software code for starting the timing controller TCON is stored in the external non-volatile memory. As a result, when the timing controller TCON works, startup data needs to be first loaded from the external non-volatile memory to the internal volatile memory, and then transmitted to the processor 21, to start processing to complete power-on and startup. Startup time of the timing controller TCON is long, and a working procedure is complex. Furthermore, the volatile memory needs continuous power supply to store data, and consequently, power consumption of the timing controller TCON is high. Resolving any one of the foregoing problems can improve performance of the timing controller TCON.

In view of this, an embodiment of this application provides a timing controller TCON in which the SRAM coupled to the processor 21 is removed.

Example 1

Figure 3:
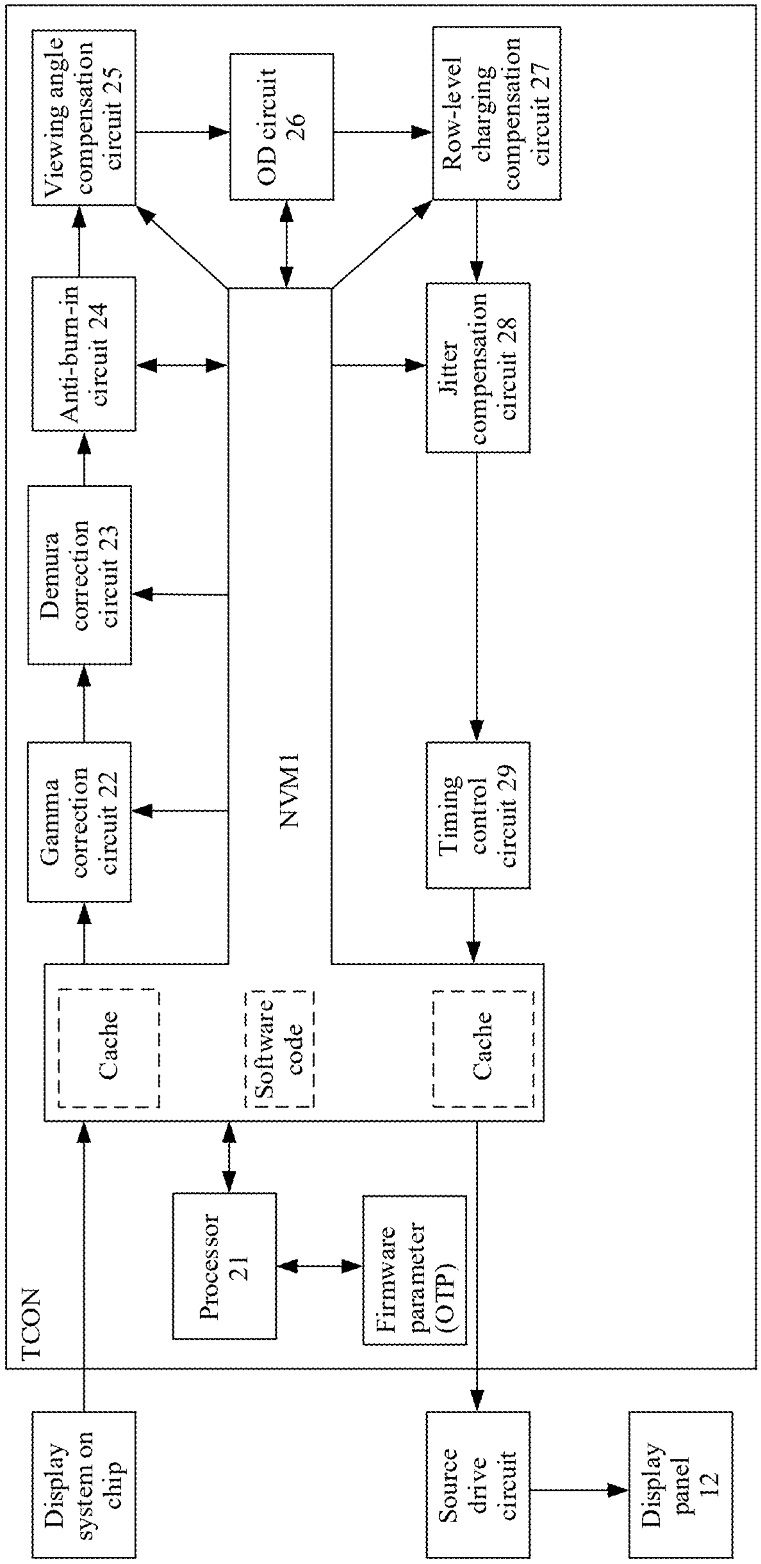
FIG. 3 is a diagram of an architecture of a timing controller and external components of the timing controller according to an embodiment of this application.

FIG. 3 is a diagram of a structure of a timing controller TCON according to an embodiment of this application. An embodiment of this application provides a timing controller TCON. As shown in FIG. 3, the timing controller TCON includes a first non-volatile memory NVM1 and a processor 21.

The processor 21 is coupled to the first non-volatile memory NVM1. The first non-volatile memory NVM1 is configured to store software code for starting the timing controller TCON. The processor 21 is configured to read the software code that is stored in the first non-volatile memory NVM1 and that is for starting the timing controller TCON.

The processor 21 includes, for example, one or more of a central processing unit (CPU), an arithmetic logic unit (ALU), or a microcontroller unit (MCU).

In other words, the software code for starting the timing controller TCON is no longer stored in an external non-volatile memory coupled to the timing controller TCON, but is directly stored in the internal first non-volatile memory NVM1 of the timing controller TCON.

It should be noted that embodiments of this application do not restrict the timing controller TCON from integrating any volatile memory internally. A structure of the timing controller TCON may be that only the first non-volatile memory NVM1 is integrated internally, or a structure of the timing controller TCON may be that the first non-volatile memory NVM1 and another non-volatile memory are integrated internally, or a structure of the timing controller TCON may be that the first non-volatile memory NVM1 and a volatile memory are integrated internally. Provided that the first non-volatile memory NVM1 is internally integrated into the timing controller TCON, this falls within the protection scope of the timing controller TCON provided in embodiments of this application.

The first non-volatile memory NVM1 is internally integrated into the timing controller TCON provided in embodiments of this application. The software code for starting the timing controller TCON is directly stored in the first non-volatile memory NVM1, and is no longer stored in the external non-volatile memory. In this way, when the timing controller TCON is started, the processor 21 may directly retrieve the software code from the first non-volatile memory NVM1, without a loading process from the external non-volatile memory to an internal volatile memory. The timing controller TCON has a fast startup speed and a simple working procedure, which can reduce a delay of the timing controller TCON. In addition, because of on-chip integration and non-volatile characteristics, the first non-volatile memory NVM1 replaces an on-chip volatile memory and an external non-volatile memory in a conventional timing controller TCON, to simplify an architecture of the timing controller TCON, and reduce an area of the timing controller TCON.

Figure 4:
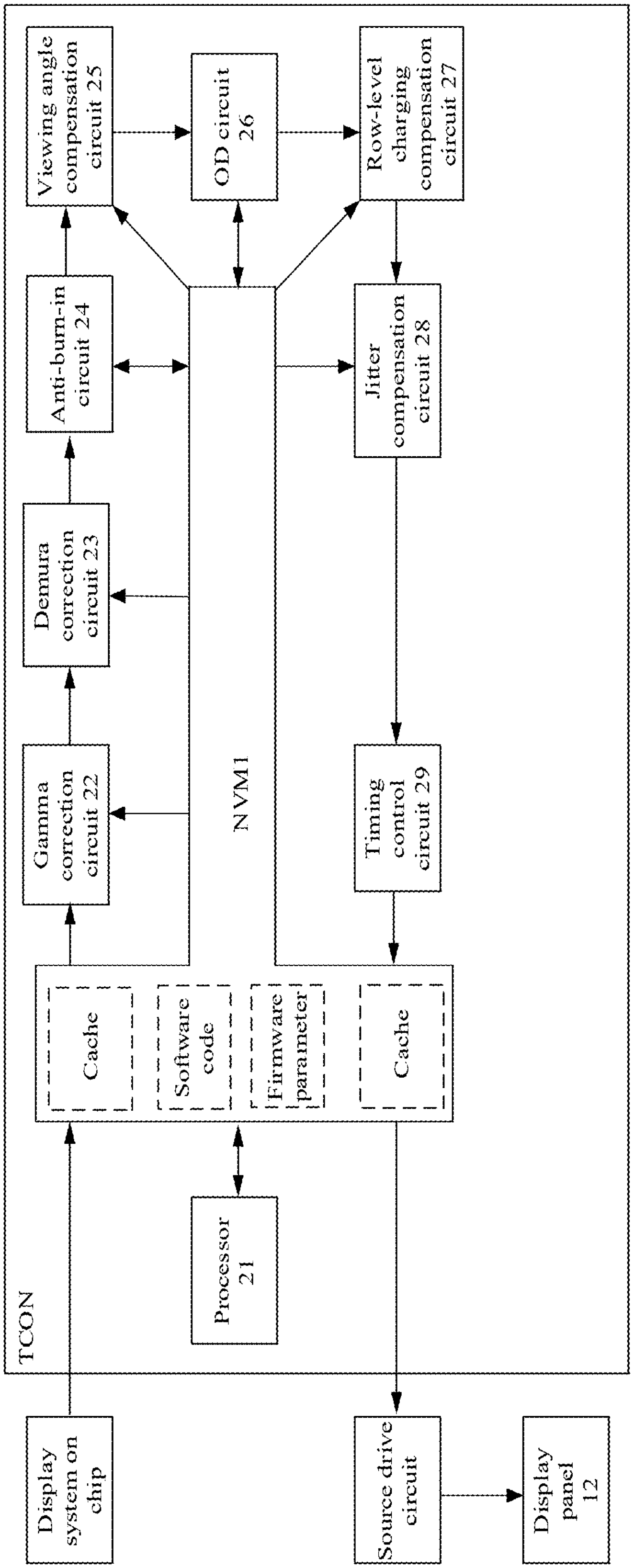
FIG. 4 is a diagram of another architecture of a timing controller and external components of the timing controller according to an embodiment of this application.

FIG. 4 is a diagram of a structure of a timing controller TCON according to an embodiment of this application. In some embodiments, as shown in FIG. 4, the first non-volatile memory NVM1 is further configured to store a firmware parameter representing identity information of the timing controller TCON. The processor 21 is further configured to read and/or write the firmware parameter.

In other words, the firmware parameter is no longer stored by a one-time programmable memory OTP, but is directly stored by the first non-volatile memory NVM1. A special hardening process is performed on the first non-volatile memory NVM1, so that the first non-volatile memory NVM1 may have a one-time programmable function.

In this case, the first non-volatile memory NVM1 is used to implement a one-time programmable storage function, and there is no need to dispose a one-time programmable memory OTP in the timing controller TCON. This reduces types of memories in the timing controller TCON, simplifies a manufacturing process of the timing controller TCON, and reduces layout difficulty of the timing controller TCON. In addition, the first non-volatile memory NVM1 is used to replace the one-time programmable memory OTP. This can reduce a possibility of inferring data in the memory through reverse observation using a microscope such as a scanning electron microscope (SEM) or a transmission electron microscope (transmission electron microscope, TEM), and improve security of the timing controller.

In some embodiments, with reference to FIG. 3, in addition to the processor 21 and the first non-volatile memory NVM1, the timing controller TCON further includes a gamma (gamma) correction circuit 22, a demura (demura) correction circuit 23, an anti-burn-in correction circuit 24, a viewing angle compensation circuit 25, an overdrive (overdrive, OD) circuit 26, a row-level charging compensation circuit 27, a jitter compensation circuit 28, and a timing control circuit 29.

The processor 21, the gamma correction circuit 22, the demura correction circuit 23, the anti-burn-in correction circuit 24, the viewing angle compensation circuit 25, the overdrive circuit 26, the row-level charging compensation circuit 27, and the jitter compensation circuit 28 are all coupled to the first non-volatile memory NVM1. The processor 21, the anti-burn-in correction circuit 24, and the overdrive circuit 26 not only need to read data from the first non-volatile memory NVM1, but also need to store data in the first non-volatile memory NVM1. The gamma correction circuit 22, the demura correction circuit 23, the viewing angle compensation circuit 25, the row-level charging compensation circuit 27, and the jitter compensation circuit 28 only need to read data from the first non-volatile memory NVM1.

A display system on chip transmits decoded video data to the timing controller TCON. For example, the gamma correction circuit 22 in the timing controller TCON receives the video data transmitted from the outside, and processes the received video data. The video data is sequentially transmitted and processed by the demura correction circuit 23, the anti-burn-in correction circuit 24, the viewing angle compensation circuit 25, the overdrive circuit 26, the row-level charging compensation circuit 27, the jitter compensation circuit 28, and the timing control circuit 29, and then is output to the timing controller TCON. A source drive circuit coupled to the timing controller TCON receives and processes the video data, and then transmits processed video data to the display panel 12.

The following describes each circuit in the timing controller TCON in detail.

In a process in which the timing controller TCON is powered on and started, the software code for starting the timing controller TCON is stored in the first non-volatile memory NVM1. During power-on and startup, the processor 21 directly reads, from the first non-volatile memory NVM1, the software code for starting the timing controller TCON.

The firmware parameter may be stored in the one-time programmable memory OTP shown in FIG. 3. The firmware parameter may alternatively be stored in the first non-volatile memory NVM1.

In some embodiments, as shown in FIG. 4, the firmware parameter is stored in the first non-volatile memory NVM1. In a process in which the timing controller TCON is powered on and started, the processor 21 directly reads the firmware parameter from the first non-volatile memory NVM1. The processor 21 may also directly write the firmware parameter into the first non-volatile memory NVM1.

In a normal use process of the timing controller TCON, to-be-displayed data is first decoded by the display system on chip, and decoded video data is transmitted to the timing controller TCON.

After the decoded video data is transmitted to the timing controller TCON, if the video data needs to be temporarily stored, the video data may be first stored in a buffer circuit. The buffer circuit may be an independent circuit, or may be integrated into the first non-volatile memory NVM1.

In some embodiments, the first non-volatile memory NVM1 is further configured to buffer video data (video data output after being decoded by the display system on chip) input from the outside. In this case, after the video data input by the display system on chip to the timing controller TCON is transmitted to the timing controller TCON, the video data is first stored in the first non-volatile memory NVM1, and a next circuit reads the buffered video data from the first non-volatile memory NVM1.

The next circuit is, for example, the gamma correction circuit 22. The gamma correction circuit 22 receives a signal (for example, video data input by the display system on chip) from an upstream circuit, obtains, from the first non-volatile memory NVM1, corresponding data for gamma correction, performs operation processing on the received signal, and outputs a processed signal to a downstream circuit.

Perception of brightness by eyes of a user is non-linear. The "non-linear" herein means that perception of display brightness by the eyes of the user is not in a linear relationship with a voltage applied to a sub pixel P on the display panel 12. To convert a data relationship into brightness perceived by human eyes, the timing controller TCON needs to perform gamma correction on the received signal. A table of non-linear relationships between photosensitivity of human eyes to a sub pixel P and a voltage applied to a sub pixel P is stored in the first non-volatile memory NVM1. After the timing controller TCON is powered on, table data in the first non-volatile memory NVM1 is sent to the gamma correction circuit 22 for corresponding calculation correction.

Another next circuit is, for example, the demura correction circuit 23. The demura correction circuit 23 receives a signal (for example, video data output by the gamma correction circuit 22) from an upstream circuit, obtains, from the first non-volatile memory NVM1, corresponding data for demura correction, performs operation processing on the received signal, and outputs a processed signal to a downstream circuit.

Due to non-uniformity of manufacturing processes, brightness of all sub pixels P on a display is not the same under a same voltage. Some regions may appear brighter, and some regions may appear darker. Demura correction is to sample screen brightness at delivery, and store brightness data of a screen at delivery in the first non-volatile memory NVM1. When demura correction needs to be performed, table data in the first non-volatile memory NVM1 is sent to the demura correction circuit 23, and the demura correction circuit 23 corrects brightness of video data based on the demura correction data, so that brightness of the entire display panel 12 has better uniformity.

Another next circuit is, for example, the anti-burn-in correction circuit 24. The anti-burn-in correction circuit 24 receives a signal (for example, video data output by the demura correction circuit 23) from an upstream circuit, obtains, from the first non-volatile memory NVM1, corresponding data for anti-burn-in correction, performs operation processing on the received signal based on the anti-burn-in correction data, and outputs a processed signal to a downstream circuit. In addition, updated anti-burn-in correction data is written (updated) into the first non-volatile memory NVM1 at a specific interval (which may be one frame or may be a longer time period).

Sub pixels P on the display panel 12 age with time. After a period of use, display brightness is reduced, and consequently image quality is reduced. Anti-burn-in correction is to store working data of each sub pixel P on the display panel 12 in the first non-volatile memory NVM1, and store data at intervals of a period of time in the first non-volatile memory NVM1. When video data is transmitted to the anti-burn-in correction circuit 24, use data (namely, the anti-burn-in correction data) of the display panel 12 is read by the anti-burn-in correction circuit 24, and the anti-burn-in correction circuit 24 performs corresponding algorithm correction processing on the received signal based on the anti-burn-in correction data, and then outputs the processed signal, to improve image quality of the display panel 12.

Another next circuit is, for example, the viewing angle compensation circuit 25. The viewing angle compensation circuit 25 receives a signal (for example, video data output by the anti-burn-in correction circuit 24) from an upstream circuit, obtains, from the first non-volatile memory NVM1, corresponding data for viewing angle compensation, performs operation processing on the received signal, and outputs a processed signal to a downstream circuit.

Due to a limitation of a defect of a panel viewing angle, a natural "defect" exists on a side of the display panel 12 when a large screen is used for viewing. When a large angle is used for viewing, a contrast causes distortion of some image colors and image quality, and a side viewing angle is limited. A viewing angle compensation technology uses a plurality of groups of gamma curves, so that liquid-crystal flip angles in each sub pixel P are not exactly the same. This can improve viewing performance of a screen at different viewing angles.

Another next circuit is, for example, the overdrive circuit 26. The overdrive circuit 26 receives a signal (for example, video data output by the viewing angle compensation circuit 25) from an upstream circuit, stores the received signal in the first non-volatile memory NVM1, and generates overdrive data of a next frame. Then, prestored overdrive data of a previous frame (overdrive data generated based on video data of a previous frame) is read from the first non-volatile memory NVM1, overdrive algorithm processing is performed on the overdrive data, and processed video data is output to a downstream circuit.

It may be understood that the overdrive data in embodiments of this application is the video data that is of the previous frame and that is stored in the first non-volatile memory NVM1.

Between different frames, response of display brightness transitioning from dark to bright is often slow. To improve a liquid-crystal response speed, the timing controller TCON buffers a frame of displayed data into the first non-volatile memory NVM1 in advance, to shorten response time through calculation by using the overdrive circuit 26.

Another next circuit is, for example, the row-level charging compensation circuit 27. The row-level charging compensation circuit 27 receives a signal (for example, video data output by the overdrive circuit 26) from an upstream circuit, obtains, from the first non-volatile memory NVM1, corresponding data for row-level charging compensation, performs operation processing on the received signal, and outputs a processed signal to a downstream circuit.

Data that is of an algorithm mapping table and that is for row-level charging compensation is stored in the first non-volatile memory NVM1. The row-level charging compensation circuit 27 reads, from the first non-volatile memory NVM1, the data for row-level charging compensation, and compensates a charging rate of a current row based on data in a previous row. This can improve a charging rate in a targeted manner, so that display brightness is accurate.

Another next circuit is, for example, the jitter compensation circuit 28. The jitter compensation circuit 28 receives a signal (for example, video data output by the row-level charging compensation circuit 27) from an upstream circuit, obtains, from the first non-volatile memory NVM1, corresponding data for jitter compensation, performs an operation on the received signal, and outputs a processed signal to a downstream circuit.

Data that is of an algorithm mapping table and that is for jitter compensation is stored in the first non-volatile memory NVM1. The jitter compensation circuit 28 reads, from the first non-volatile memory NVM1, the data for jitter compensation, and performs algorithm processing on the video data. The jitter compensation circuit 28 performs jitter compensation on the received signal in a spatial domain and a temporal domain, to make an image more delicate.

Another next circuit is, for example, the timing control circuit 29. The timing control circuit 29 receives a signal (for example, video data output by the jitter compensation circuit 28), processes the received signal, and outputs a timing control signal.

Finally, the video data is output to a source drive circuit outside the timing controller TCON through a series of data buffers, and the source drive circuit converts a digital signal of the video data into an analog signal. Then, the analog signal is transmitted to the display panel 12 for image display.

When the video data output to the outside of the timing controller TCON needs to be temporarily stored, the video data may be stored in a separate buffer circuit or stored in the first non-volatile memory NVM1.

In some embodiments, the first non-volatile memory NVM1 is further configured to buffer a timing control signal output to the outside. In this case, the timing control signal generated by the timing controller TCON is first stored in the first non-volatile memory NVM1, and then is output from the first non-volatile memory NVM1 to the source drive circuit.

It may be understood that a sequence of circuits in the timing controller TCON shown in FIG. 3 may be randomly adjusted according to an application requirement. The sequence in FIG. 3 is merely an example. In addition, types of circuits included in the timing controller TCON may be added or removed according to an application requirement. The circuits included in FIG. 3 are merely an example.

It can be learned from the foregoing descriptions that the software code required by the processor 21, the gamma correction data required by the gamma correction circuit 22, the demura correction data required by the demura correction circuit 23, the anti-burn-in correction data required by the anti-burn-in correction circuit 24, the viewing angle compensation data required by the viewing angle compensation circuit 25, the data that is of the previous frame and that is required by the overdrive circuit 26, the row-level charging compensation data required by the row-level charging compensation circuit 27, and the jitter compensation data required by the jitter compensation circuit 28 may be all stored in the first non-volatile memory NVM1.

In some embodiments, as shown in FIG. 3, the memory embedded in the timing controller TCON includes only a non-volatile memory (for example, the first non-volatile memory NVM1), and does not include a volatile memory.

In some embodiments, the first non-volatile memory NVM1 and the processor 21 are integrated into a same bare die (die).

In this case, the first non-volatile memory NVM1 is an on-chip non-volatile memory.

In some embodiments, the first non-volatile memory NVM1 and the processor 21 are separately disposed in two bare dies.

In this case, the first non-volatile memory NVM1 is an off-chip non-volatile memory, but may be co-packaged in a same chip with a functional circuit in the timing controller TCON.

Certainly, another functional circuit in the timing controller TCON may be integrated into a same bare die with the processor 21.

Each storage unit in the on-chip volatile memory usually needs to include six transistors. As a result, an area of the volatile memory is large. In embodiments of this application, the first non-volatile memory NVM1 is internally integrated into the timing controller TCON, and each storage unit in the first non-volatile memory NVM1 usually has only one transistor. Therefore, an area ratio of the first non-volatile memory NVM1 is greatly reduced, and an area of the timing controller TCON can be reduced.

In addition, a non-volatile storage function required by the timing controller TCON is provided by the first non-volatile memory NVM1 in the timing controller TCON. This eliminates a need for an external non-volatile memory that is configured to store data in a case of a power failure and that is in a conventional timing controller TCON, and a structure is simple. In addition, the on-chip first non-volatile memory NVM1 may implement functions of the volatile memory, the one-time programmable memory, and the external non-volatile memory. This unifies types of memories used in the timing controller TCON, simplifies a process, and reduces costs.

Moreover, because the memory integrated into the timing controller TCON is the first non-volatile memory NVM1, when data is maintained, the first non-volatile memory NVM1 can maintain the data without requiring power supply. In comparison with a case in which power needs to be supplied to a conventional volatile memory to maintain data, the timing controller TCON provided in embodiments of this application can greatly reduce power consumption of the timing controller TCON.

Furthermore, because the data that needs to be stored in a case of a power failure is directly stored in the on-chip first non-volatile memory NVM1, when the timing controller TCON works, each circuit may directly read corresponding data from the first non-volatile memory NVM1. However, in the conventional timing controller TCON, data needs to be first loaded from the external non-volatile memory to the on-chip volatile memory, so that each circuit can load corresponding data from the volatile memory. Therefore, the timing controller TCON provided in embodiments of this application can optimize a system architecture, and reduce a delay of the timing controller TCON.

An embodiment of this application further provides a working method of a timing controller. The timing controller TCON includes a processor and a non-volatile memory.

The working method includes: At a power-on and startup period, the processor directly reads, from the non-volatile memory, software code for starting the timing controller TCON.

According to the working method of the timing controller in embodiments of this application, in a power-on and startup process, the timing controller TCON directly retrieves the software code from the internal non-volatile memory of the timing controller, without loading the software code from an external non-volatile memory to the internal non-volatile memory. The timing controller TCON has a fast startup speed and a simple working procedure, which can reduce a delay of the timing controller TCON.

In some embodiments, the timing controller TCON further includes a gamma correction circuit 22.

The working method further includes: After the timing controller TCON is started, at a gamma correction period, the gamma correction circuit 22 receives a signal (for example, video data), directly reads gamma correction data from the non-volatile memory, and performs gamma correction on the received signal.

After the timing controller TCON is powered on and started, if gamma correction needs to be performed on the received signal, the gamma correction data is directly read from the non-volatile memory, without loading the gamma correction data from the external non-volatile memory to the internal non-volatile memory. A working procedure of the timing controller TCON is simple, and a response speed is fast.

In some embodiments, the timing controller TCON further includes a demura correction circuit 23.

The working method further includes: After the timing controller TCON is started, at a demura correction period, the demura correction circuit 23 receives a signal (for example, video data), directly reads demura correction data from the non-volatile memory, and performs demura correction on the received signal.

After the timing controller TCON is powered on and started, if demura correction needs to be performed on the received signal, the demura correction data is directly read from the non-volatile memory, without loading the demura correction data from the external non-volatile memory to the internal non-volatile memory. A working procedure of the timing controller TCON is simple, and a response speed is fast.

In some embodiments, the timing controller TCON further includes an anti-burn-in correction circuit 24.

The working method further includes: After the timing controller TCON is started, at an anti-burn-in correction period, the anti-burn-in correction circuit 24 receives a signal (for example, video data), directly reads anti-burn-in correction data from the non-volatile memory, and performs anti-burn-in correction on the received signal.

After the timing controller TCON is powered on and started, if anti-burn-in correction needs to be performed on the received signal, the anti-burn-in correction data is directly read from the non-volatile memory, without loading the anti-burn-in correction data from the external non-volatile memory to the internal non-volatile memory. A working procedure of the timing controller TCON is simple, and a response speed is fast.

In some embodiments, the timing controller TCON further includes a viewing angle compensation circuit 25.

The working method further includes: After the timing controller TCON is started, at a viewing angle compensation period, the viewing angle compensation circuit 25 receives a signal (for example, video data), directly reads viewing angle compensation data from the non-volatile memory, and performs viewing angle compensation on the received signal.

After the timing controller TCON is powered on and started, if viewing angle compensation needs to be performed on the received signal, the viewing angle compensation data is directly read from the non-volatile memory, without loading the viewing angle compensation data from the external non-volatile memory to the internal non-volatile memory. A working procedure of the timing controller TCON is simple, and a response speed is fast.

In some embodiments, the timing controller TCON further includes an overdrive circuit 26.

The working method further includes: After the timing controller TCON is started, at an overdrive compensation period, the overdrive circuit 26 receives a signal (for example, video data), writes the received signal into the non-volatile memory, directly reads overdrive data from the non-volatile memory, processes the overdrive data, and outputs processed overdrive data.

After the timing controller TCON is powered on and started, if overdrive compensation needs to be performed on the received signal, the overdrive data is directly read from the non-volatile memory, without loading the overdrive data from the external non-volatile memory to the internal non-volatile memory. A working procedure of the timing controller TCON is simple, and a response speed is fast.

In some embodiments, the timing controller TCON further includes a row-level charging compensation circuit 27.

The working method further includes: After the timing controller TCON is started, at a row-level charging compensation period, the row-level charging compensation circuit 27 receives a signal (for example, video data), directly reads row-level charging compensation data from the non-volatile memory, and performs row-level charging compensation on the received signal.

After the timing controller TCON is powered on and started, if row-level charging compensation needs to be performed on the received signal, the row-level charging compensation data is directly read from the non-volatile memory, without loading the row-level charging compensation data from the external non-volatile memory to the internal non-volatile memory. A working procedure of the timing controller TCON is simple, and a response speed is fast.

In some embodiments, the timing controller TCON further includes a jitter compensation circuit 28.

The working method further includes: After the timing controller TCON is started, at a jitter compensation period, the jitter compensation circuit 28 receives a signal (for example, video data), directly reads jitter compensation data from the non-volatile memory, and performs jitter compensation on the received signal.

After the timing controller TCON is powered on and started, if jitter compensation needs to be performed on the received signal, the jitter compensation data is directly read from the non-volatile memory, without loading the jitter compensation data from the external non-volatile memory to the internal non-volatile memory. A working procedure of the timing controller TCON is simple, and a response speed is fast.

For a structure of the first non-volatile memory NVM1, in some embodiments, the first non-volatile memory NVM1 includes a first control circuit and a first storage array. The first control circuit is coupled to the first storage array, and is configured to control reading of the first storage array. The first storage array includes a plurality of storage units.

A manner in which the first non-volatile memory NVM1 provides a storage function for each circuit in the timing controller TCON is as follows:

In some embodiments, the first non-volatile memory NVM1 is physically divided into a plurality of storage modules, and a circuit that is in the timing controller TCON and that is coupled to the first non-volatile memory NVM1 is correspondingly coupled to one or more storage modules.

For example, the first control circuit includes a plurality of first control subcircuits, and the first storage array includes a plurality of first array modules. The first non-volatile memory NVM1 includes a plurality of storage modules, and each storage module includes a first control subcircuit and a first array module.

In this case, the circuit coupled to the first non-volatile memory NVM1 is referred to as an X circuit. The timing controller TCON shown in FIG. 3 is used as an example. The X circuit may be the processor 21, the gamma correction circuit 22, the demura correction circuit 23, the anti-burn-in correction circuit 24, the viewing angle compensation circuit 25, the overdrive circuit 26, the row-level charging compensation circuit 27, or the jitter compensation circuit 28 in the timing controller TCON shown in FIG. 3.

Figure 5A:
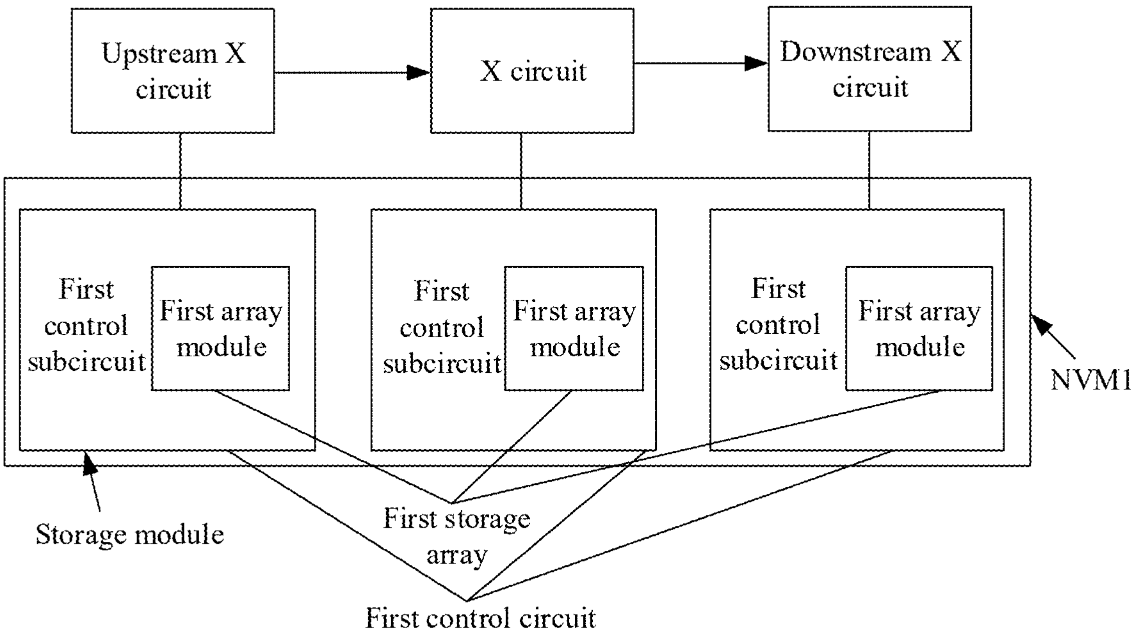
FIG. 5A is a diagram of a relationship between a first non-volatile memory and circuits in a timing controller according to an embodiment of this application.

As shown in FIG. 5A, each X circuit is correspondingly coupled to one or more storage modules. When the X circuit is an intermediate transmission circuit, the X circuit is further coupled to an upstream X circuit and a downstream X circuit; and an input end of the X circuit obtains video data from the upstream X circuit, processes a received signal, and transmits a processed signal to the downstream X circuit.

Figure 5B:
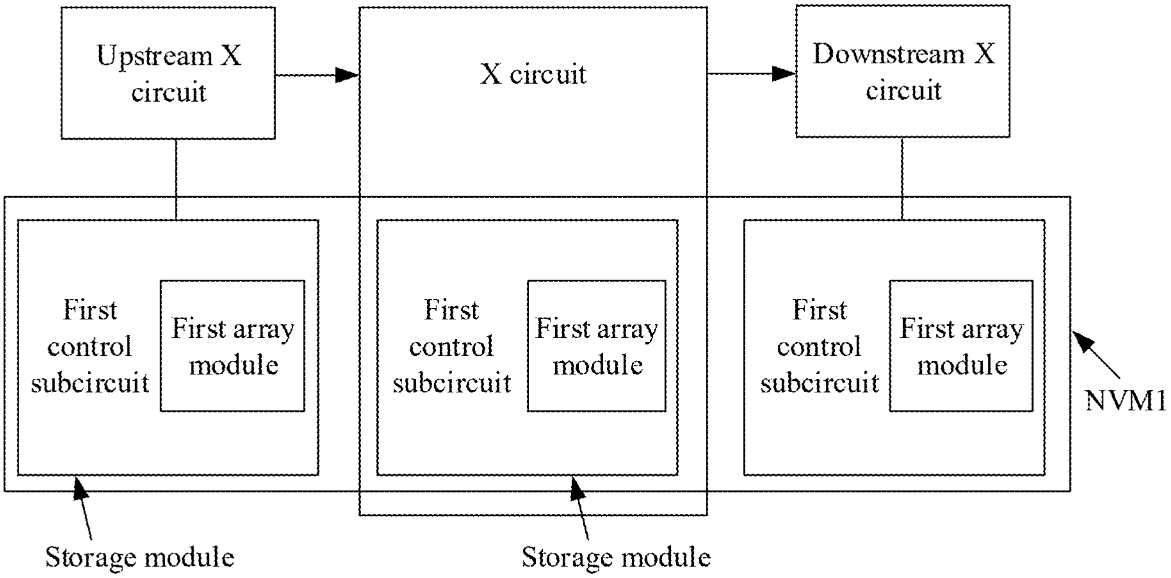
FIG. 5B is diagram of another relationship between a first non-volatile memory and circuits in a timing controller according to an embodiment of this application.

In some embodiments, as shown in FIG. 5B, the storage module may be integrated into the X circuit, or the storage module may be located outside the X circuit, and may be properly disposed as required.

In some embodiments, transistors included in logical parts of some or all circuits in the timing controller TCON and transistors in the first non-volatile memory NVM1 are integrated into a same chip.

In some other embodiments, the first non-volatile memory NVM1 is divided into a plurality of storage regions based on an address, and a circuit that is in the timing controller TCON and that is coupled to the first non-volatile memory NVM1 corresponds to one or more storage regions.

Figure 6:
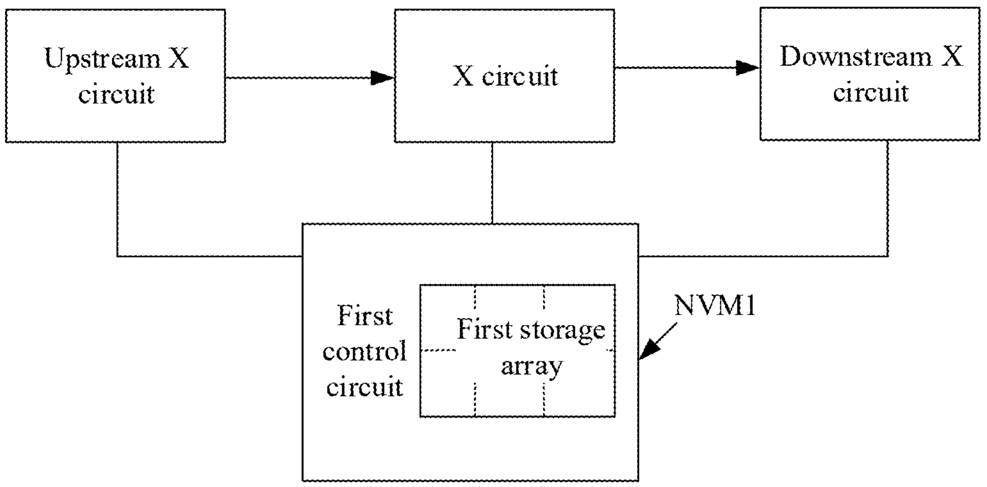
FIG. 6 is a diagram of still another relationship between a first non-volatile memory and circuits in a timing controller according to an embodiment of this application.

For example, as shown in FIG. 6, each X circuit is correspondingly coupled to the first control circuit. When the X circuit is an intermediate transmission circuit, the X circuit is further coupled to an upstream X circuit and a downstream X circuit; and an input end of the X circuit obtains video data from the upstream X circuit, processes a received signal, and transmits a processed signal to the downstream X circuit.

Figure 7:
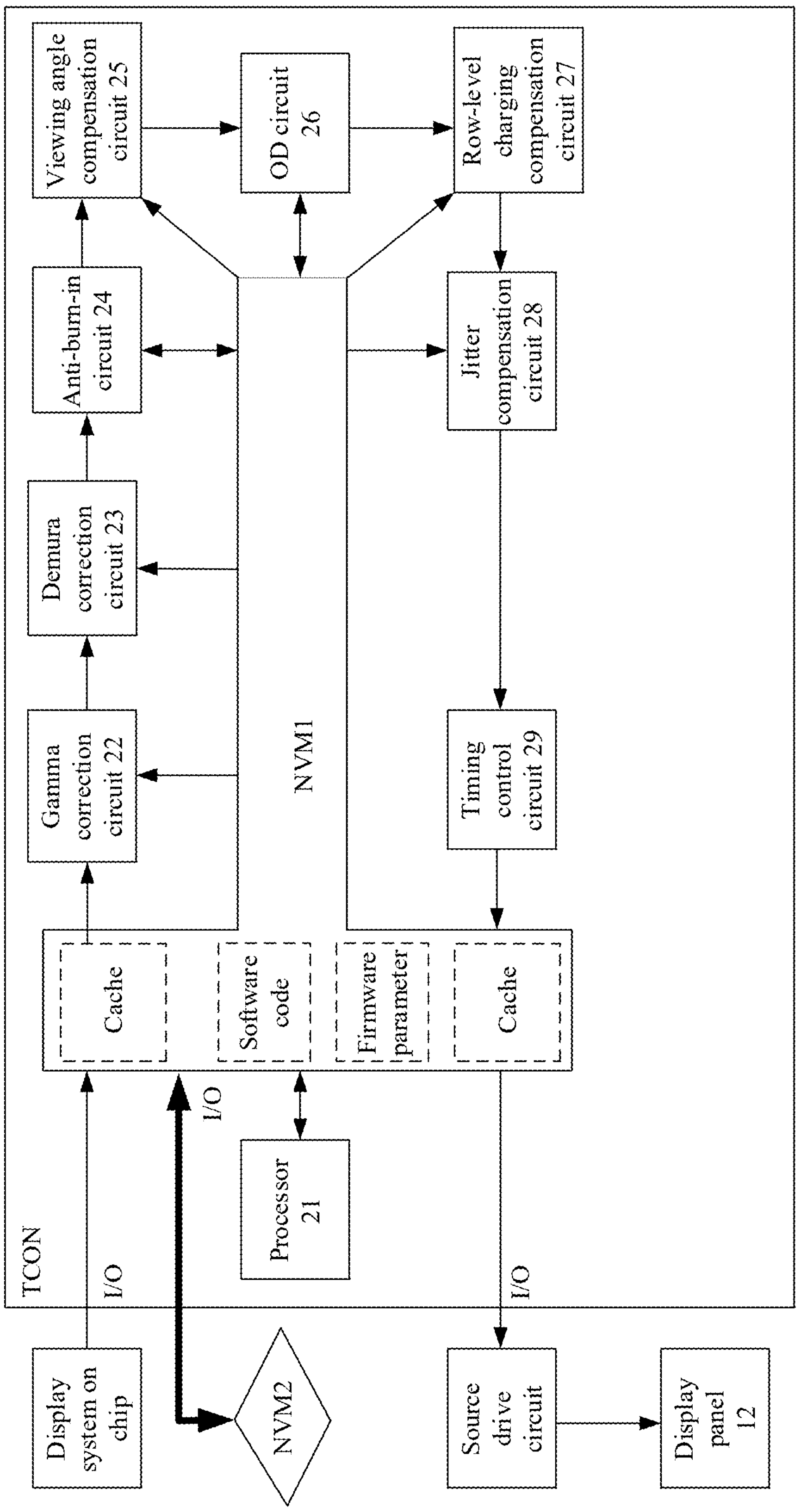
FIG. 7 is a diagram of still another architecture of a timing controller and external components of the timing controller according to an embodiment of this application.

In some embodiments, as shown in FIG. 7, the timing controller TCON further includes an input/output I/O interface. The input/output I/O interface is coupled to the first non-volatile memory NVM1, and is configured to perform writing or reading with the outside of the timing controller TCON.

In some embodiments, some X circuits in the timing controller TCON read data from only the first non-volatile memory NVM1, and some X circuits in the timing controller TCON not only read data from the first non-volatile memory NVM1, but also write data obtained after operation processing by the some X circuits into the first non-volatile memory NVM1. The first non-volatile memory NVM1 stores the written data, and updates or does not update previous data as required.

The input/output I/O interface is directly coupled to the first non-volatile memory NVM1, and the first non-volatile memory NVM1 is connected to another structure that is external, through the input/output I/O interface.

For example, the first non-volatile memory NVM1 is connected to a display system on chip that is external, through the input/output I/O interface, and is configured to receive data decoded by the display system on chip.

Alternatively, for example, the first non-volatile memory NVM1 is connected to a source drive circuit that is external, through the input/output I/O interface, and is configured to output a digital signal for display to the source drive circuit.

Alternatively, for example, the first non-volatile memory NVM1 is connected to a second non-volatile memory NVM2 that is external, through the input/output I/O interface, and directly performs writing and reading operations from the outside of the timing controller TCON through the input/output I/O interface.

For example, the first non-volatile memory NVM1 receives, from the outside of the timing controller TCON through the input/output I/O interface, data required by one or more of the processor 21, the gamma correction circuit 22, the demura correction circuit 23, the anti-burn-in correction circuit 24, the viewing angle compensation circuit 25, the overdrive circuit 26, the row-level charging compensation circuit 27, and the jitter compensation circuit 28.

Figure 8:
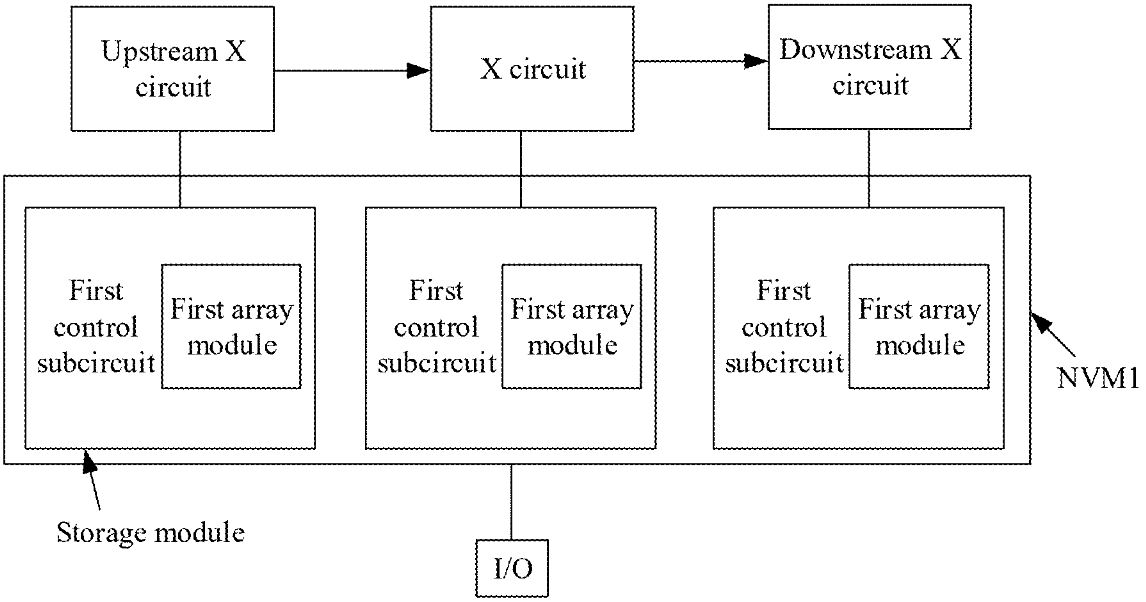
FIG. 8 is a diagram of yet another relationship between a first non-volatile memory and circuits in a timing controller according to an embodiment of this application.

In some embodiments, as shown in FIG. 8, the input/output I/O interface exists independently, and the X circuit is coupled to the input/output I/O interface through the first non-volatile memory NVM1.

Figure 9:
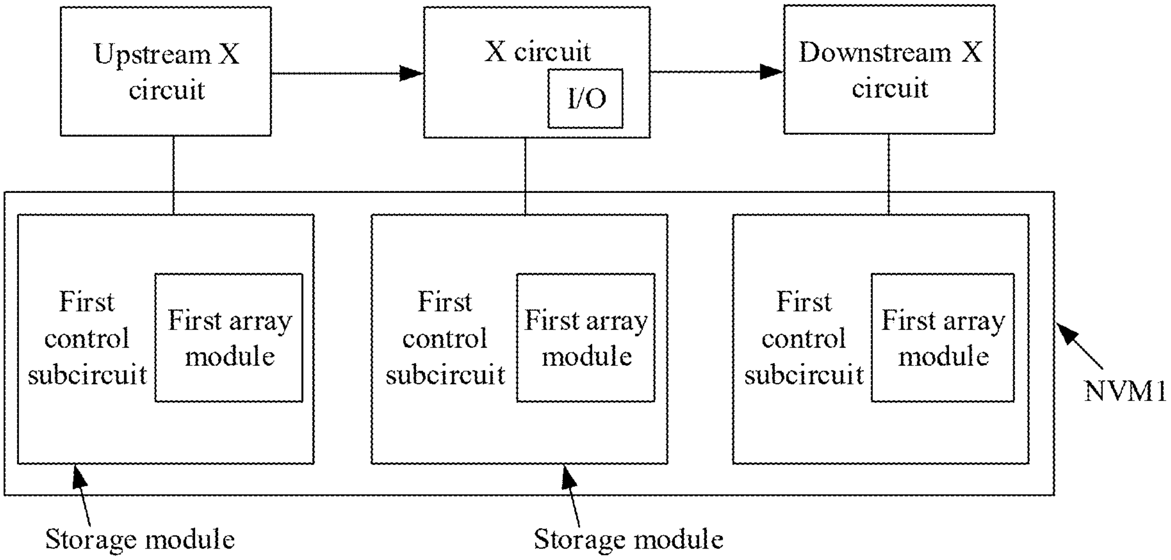
FIG. 9 is a diagram of still yet another relationship between a first non-volatile memory and circuits in a timing controller according to an embodiment of this application.

In some other embodiments, as shown in FIG. 9, the input/output I/O interface is integrated into the X circuit, and the X circuit may be directly coupled to the input/output I/O interface.

Figure 10:
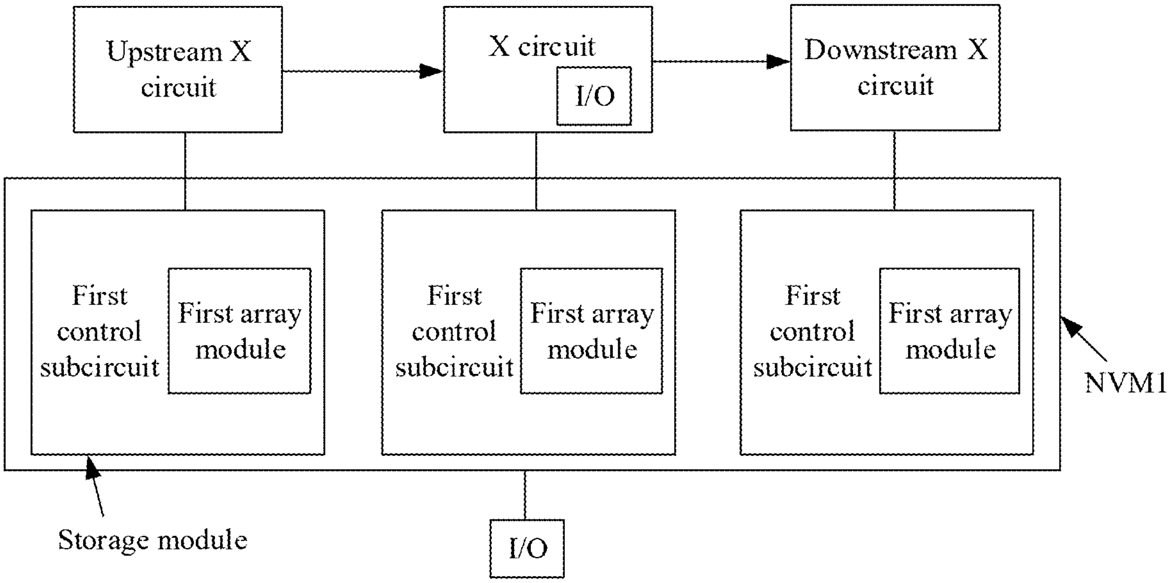
FIG. 10 is a diagram of a further relationship between a first non-volatile memory and circuits in a timing controller according to an embodiment of this application.

In still some other embodiments, as shown in FIG. 10, some input/output I/O interfaces exist independently, and some input/output I/O interfaces are integrated into the X circuit.

Certainly, a logical part of the X circuit may be integrated with or may not be integrated with the first control subcircuit of the first non-volatile memory NVM1. The accompanying drawings in embodiments of this application are merely examples, and do not constitute any limitation.

For structures of the first non-volatile memory NVM1 and the second non-volatile memory NVM2, in some embodiments, the first non-volatile memory NVM1 and the second non-volatile memory NVM2 include one or more of a read-only memory (ROM), a flash (flash) memory, a ferroelectric memory (FeRAM; FeFET), a magnetoresistive random access memory (MRAM), a resistive random access memory (RRAM), and a phase-change random access memory (PCRAM).

The flash memory may include, for example, a floating gate (floating gate) flash memory added at a gate of a transistor, a silicon-oxide-nitride-oxide-silicon (SONOS) flash memory, or a nano crystal (nano crystal) flash memory.

A characteristic of the magnetoresistive random access memory (MRAM) is that a memory formed by combining a transistor and a magnetic tunneling junction (magnetic tunneling junction, MTJ) by using a toggle (toggle), a spin transfer torque (STT), a spin orbit torque (SOT), or a voltage control magnetic anisotropy (VCMA) is used to store information in relative magnetic periods of two layers of magnetic materials of the magnetic tunneling junction.

A characteristic of the resistive random access memory (RRAM) is that a memory is formed by combining a transistor and a resistor with a variable resistance. By exerting an external voltage on the variable resistance, a conducting filament can be created/annihilated in a middle of a resistance layer. The resistive random access memory includes, for example, an oxygen vacancy memory (OxRAM) or a conductive bridge memory (CBRAM).

A characteristic of the phase-change random access memory (PCRAM) is that a transistor is combined with a phase-change material, and a resistance of the phase-change material changes with a crystal phase.

The ferroelectric memory is classified into two types. One type is FeRAM, and the other type is FeFET. A characteristic of the FeRAM is that a drain of a transistor is combined with a ferroelectric material. A characteristic of the FeFET is that a layer of ferroelectric material is added to a gate of a transistor, and information is stored in a polarity of the ferroelectric material. The FeRAM may be, for example, a ferroelectric memory of a 1T-1C (1 transistor+1 capacitor) structure, and the FeFET may be, for example, a ferroelectric memory of a 1T-1G (1 transistor+1 gate) structure.

It should be emphasized that the timing controller TCON provided in embodiments of this application may exist, for example, in a chip or in another form. Certainly, the timing controller TCON may be a bare die, or the timing controller TCON may be a packaged chip.

In some embodiments, an embodiment of this application further provides a display module. The display module includes a display panel 12 and the timing controller TCON. The timing controller TCON is configured to provide a timing control signal for the display panel 12.

In some embodiments, the display module further includes a second non-volatile memory NVM2. The second non-volatile memory NVM2 is coupled to the timing controller TCON, and is used as an external memory of the timing controller TCON.

The second non-volatile memory NVM2 includes, for example, a second control circuit and a second storage array.

Figure 11A:
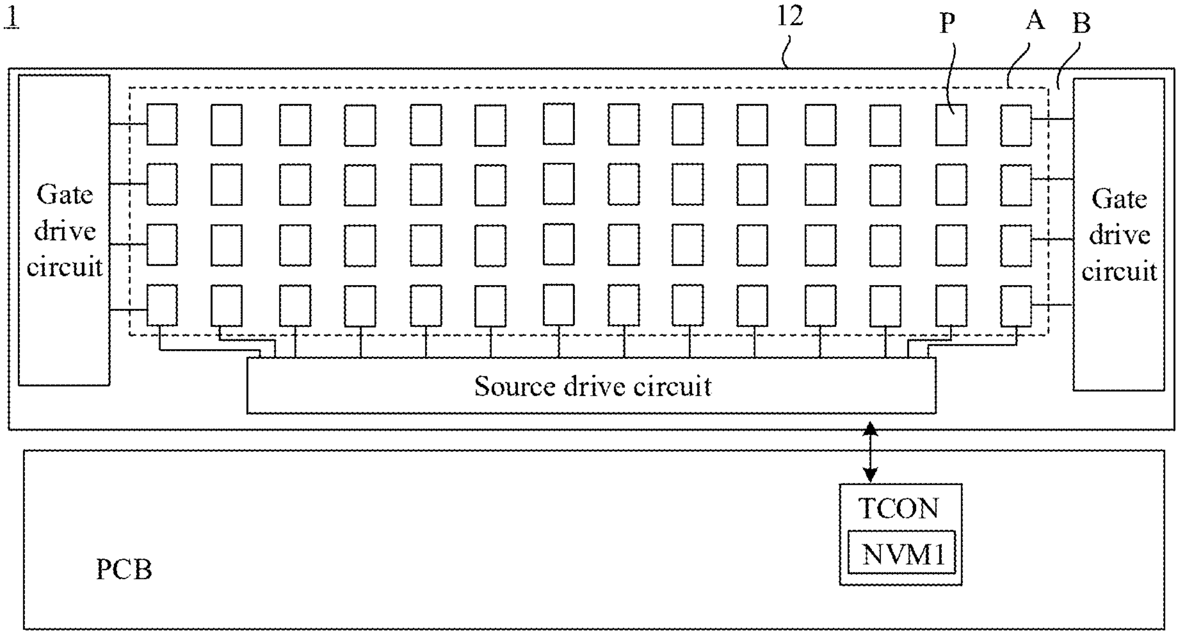
FIG. 11A to FIG. 11D each are a diagram of another layout of an electronic device according to an embodiment of this application.

When the timing controller TCON provided in this example is used in an electronic device 1, as shown in FIG. 11A, the electronic device 1 includes the display panel 12 and the timing controller TCON.

For example, as shown in FIG. 11A, the timing controller TCON is disposed outside the display panel 12. For example, the timing controller TCON is disposed in a PCB of the electronic device 1.

Figure 11B:
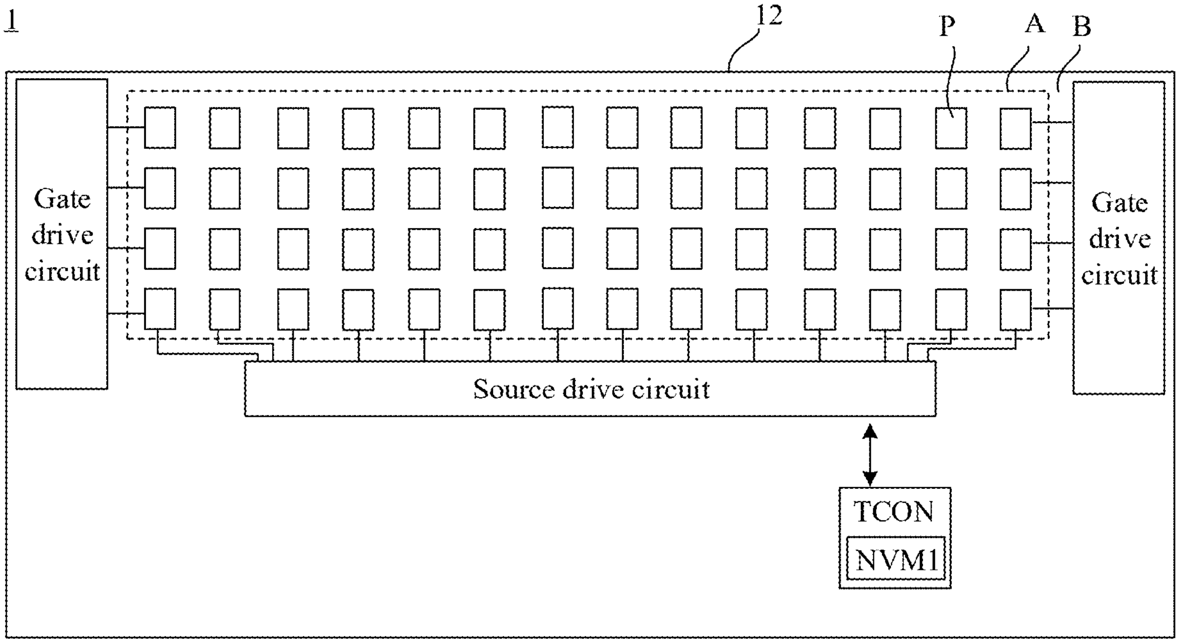

Alternatively, for example, as shown in FIG. 11B, the timing controller TCON is integrated into the display panel 12.

Figure 11C:
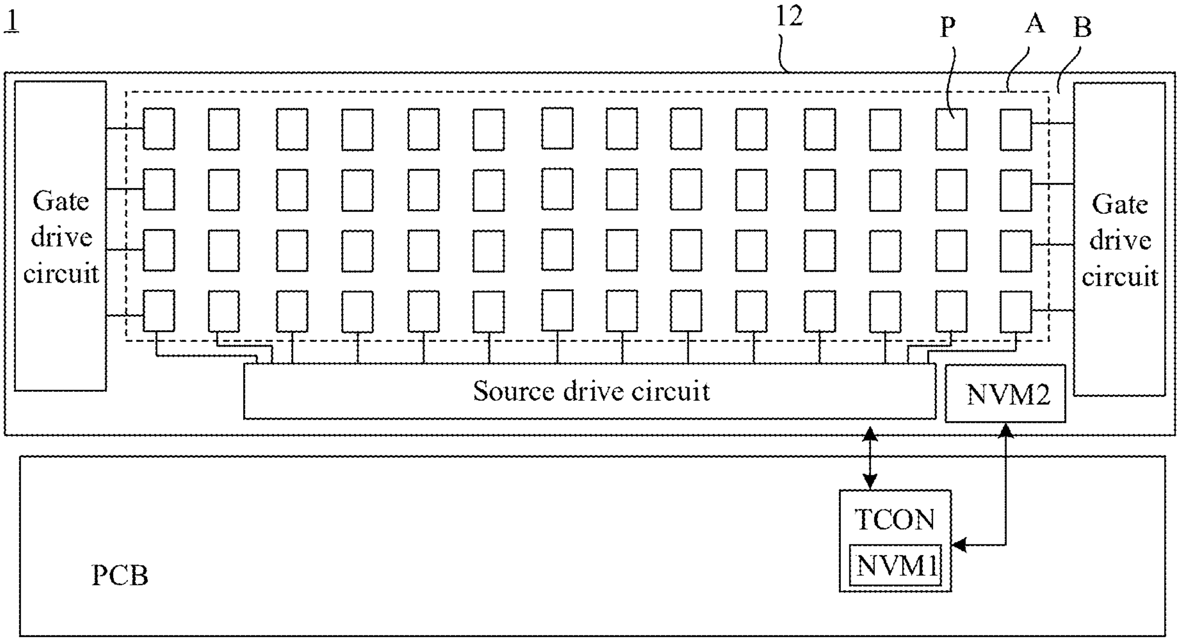

In some embodiments, as shown in FIG. 11C, the electronic device 1 further includes the second non-volatile memory NVM2. The second non-volatile memory NVM2 is integrated into the display panel 12, the timing controller TCON is disposed outside the display panel 12, and the timing controller TCON is coupled to the second non-volatile memory NVM2.

Figure 11D:
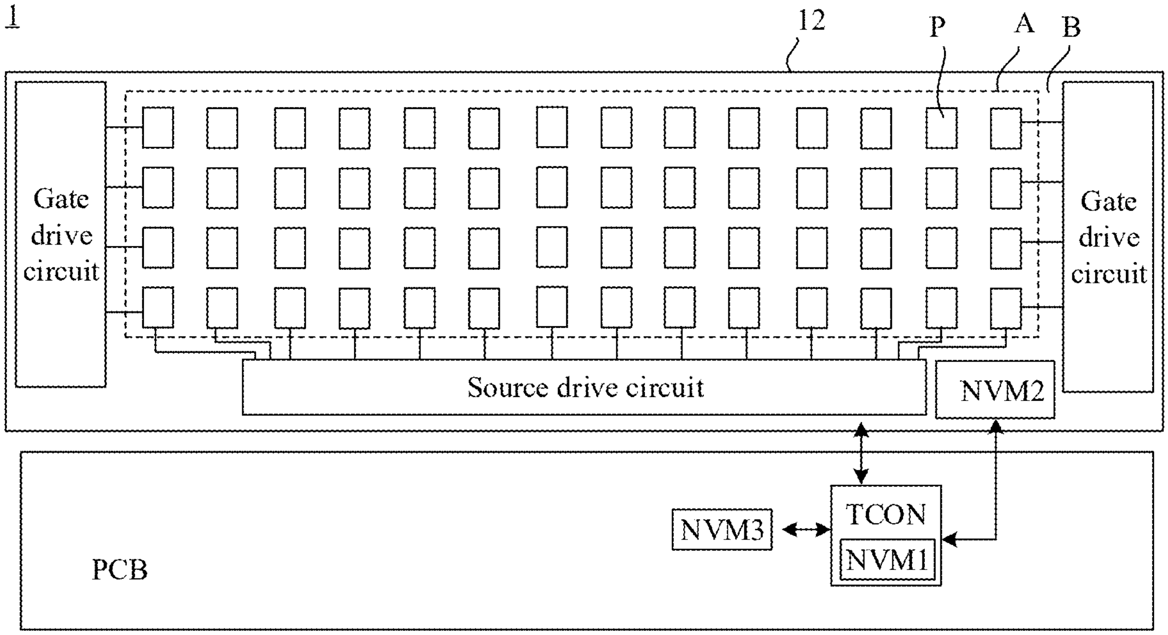

In some embodiments, as shown in FIG. 11D, the electronic device 1 further includes the second non-volatile memory NVM2 and a third non-volatile memory NVM3. The second non-volatile memory NVM2 is integrated into the display panel 12, the third non-volatile memory NVM3 is disposed outside the display panel 12, the timing controller TCON is disposed outside the display panel 12, and the timing controller TCON is coupled to the second non-volatile memory NVM2 and the third non-volatile memory NVM3.

Example 2

Figure 12:
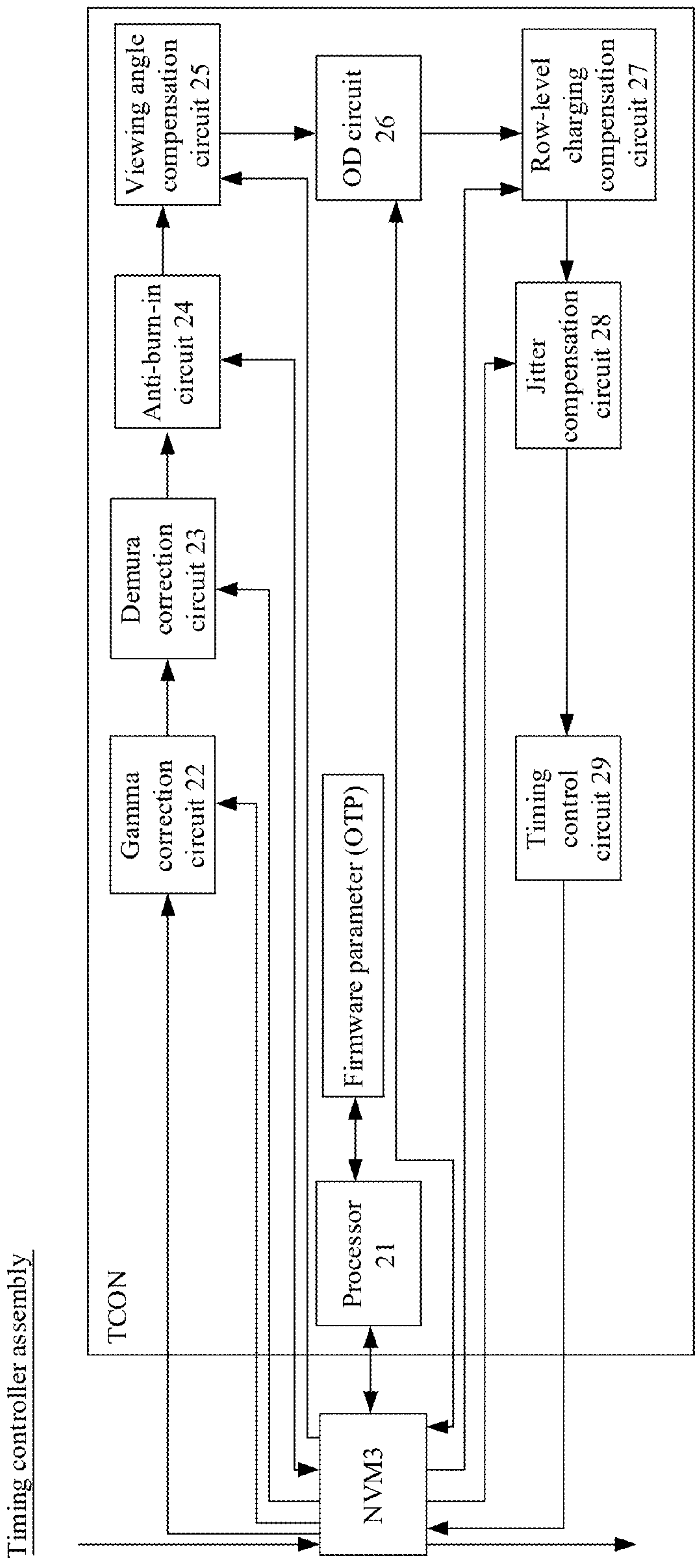
FIG. 12 is a diagram of an architecture of a timing control assembly according to an embodiment of this application.

An embodiment of this application further provides a timing controller assembly. As shown in FIG. 12, the timing controller assembly includes a timing controller TCON and a third non-volatile memory NVM3, and the third non-volatile memory NVM3 is disposed outside the timing controller TCON. The timing controller TCON includes a processor 21, the processor 21 is directly coupled to the third non-volatile memory NVM3, and the third non-volatile memory NVM3 stores software code for starting the timing controller TCON.

A main difference between the timing controller TCON in this example and the timing controller TCON in Example 1 lies in that no first non-volatile memory NVM1 is disposed in the timing controller TCON in this example. A main difference between the timing controller TCON in this example and the timing controller TCON in a conventional technology lies in that no volatile memory is disposed in the timing controller TCON.

In this case, a storage function of the timing controller assembly provided in this example is provided by the third non-volatile memory NVM3, and the third non-volatile memory NVM3 may be the same as the first non-volatile memory NVM1 in Example 1. For details, refer to the related descriptions of the first non-volatile memory NVM1 in Example 1.

In some embodiments, the timing controller TCON and the third non-volatile memory NVM3 in the timing controller assembly are two independent chips.

For example, when the timing controller TCON and the third non-volatile memory NVM3 are two independent chips, the timing controller assembly may be a chip package assembly obtained after the two chips are packaged together, or the timing controller assembly may be an assembly that connects the two chips. A form of the timing controller assembly is not limited in embodiments of this application.

In some embodiments, the timing controller TCON further includes a functional circuit. The functional circuit is configured to implement a function of the timing controller TCON. The functional circuit is directly coupled to the third non-volatile memory NVM3, and the third non-volatile memory NVM3 stores data for implementing a function of the functional circuit.

For example, as shown in FIG. 12, the functional circuit included in the timing controller TCON may be, for example, one or more of a gamma correction circuit 22, a demura correction circuit 23, an anti-burn-in correction circuit 24, a viewing angle compensation circuit 25, an overdrive circuit 26, a row-level charging compensation circuit 27, or a jitter compensation circuit 28. For example, if the functional circuit is the gamma correction circuit 22, the third non-volatile memory NVM3 should store data for gamma correction. For data stored in the third non-volatile memory NVM3, refer to the data stored in the first non-volatile memory NVM1 when the first non-volatile memory NVM1 is coupled to a corresponding functional circuit in Example 1.

In some embodiments, the timing controller TCON further includes a one-time programmable memory OTP, configured to store a firmware parameter representing identity information of the timing controller TCON.

Certainly, the firmware parameter may alternatively be stored in the third non-volatile memory NVM3, and no one-time programmable memory OTP needs to be disposed in the timing controller TCON.

In the timing controller assembly provided in this example, no volatile memory is disposed in the timing controller TCON. This can reduce an area ratio of the timing controller TCON. In addition, a storage function required by the timing controller TCON is provided by the third non-volatile memory NVM3. When data is maintained, the third non-volatile memory NVM3 can maintain the data without requiring power supply. This can greatly reduce power consumption of the timing controller assembly. Moreover, because data required by the timing controller TCON is stored in the third non-volatile memory NVM3, when the timing controller TCON works, each circuit may directly read corresponding data from the third non-volatile memory NVM3. This can optimize a system architecture, and reduce a delay of the timing controller TCON.

Figure 13A:
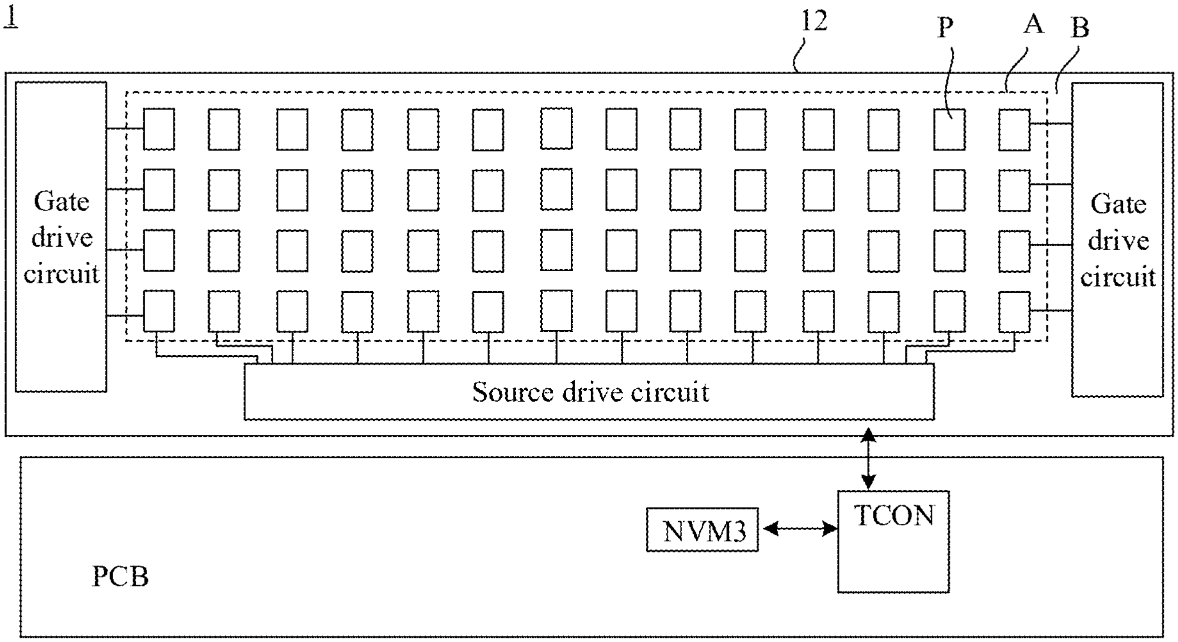
FIG. 13A and FIG. 13B each are a diagram of still another layout of an electronic device according to an embodiment of this application.

When the timing controller TCON provided in this example is used in an electronic device 1, as shown in FIG. 13A, the electronic device 1 includes a display panel 12 and a timing controller assembly (including a timing controller TCON and a third non-volatile memory NVM3).

For example, as shown in FIG. 13A, the timing controller assembly is disposed on a PCB of the electronic device 1.

Figure 13B:
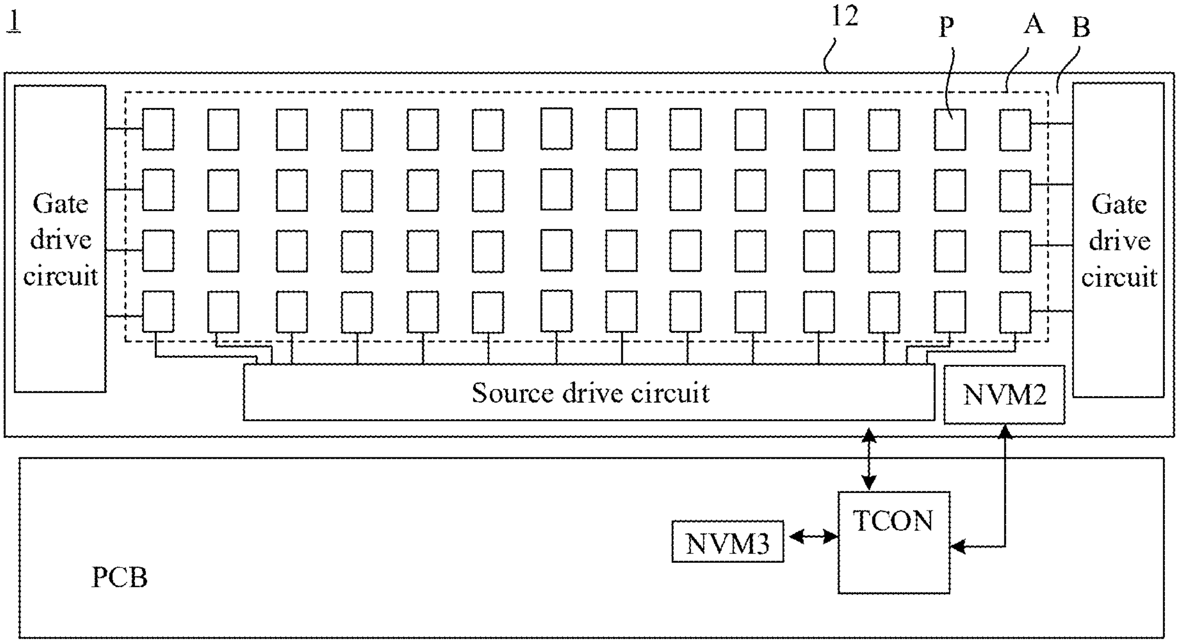

In some embodiments, as shown in FIG. 13B, the electronic device 1 further includes a second non-volatile memory NVM2. The second non-volatile memory NVM2 is integrated into the display panel 12, and the timing controller TCON is further coupled to the second non-volatile memory NVM2.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A timing controller, configured to be used in a display panel and provide a timing control signal for driving the display panel, wherein the timing controller comprises:
- a first non-volatile memory, configured to store software code for starting the timing controller;
- a processor, configured to read the software code;
- a demura correction circuit, configured to perform demura correction processing on a received first signal and output a processed first signal;
- an anti-burn-in correction circuit, configured to perform anti-burn-in correction processing on a received second signal and output a processed second signal; and
- a timing control circuit, configured to process a received third signal and output the timing control signal;
- wherein the first non-volatile memory is further configured to:
  - store the timing control signal; and
  - buffer the timing control signal prior to the timing control signal being output to an external memory.

2. The timing controller according to claim 1,
- wherein the first non-volatile memory is further configured to store a firmware parameter representing identity information of the timing controller; and
- wherein the processor is further configured to read and/or write the firmware parameter.

3. The timing controller according to claim 1, wherein the first non-volatile memory is further configured to store demura correction data; and wherein the demura correction circuit is configured to perform demura correction processing on the received first signal based on the demura correction data read from the first non-volatile memory, and output the processed first signal.

4. The timing controller according to claim 1, wherein the first non-volatile memory is further configured to store anti-burn-in correction data; and wherein the anti-burn-in correction circuit is configured to perform anti-burn-in correction processing on the received second signal based on the anti-burn-in correction data read from the first non-volatile memory, output the processed second signal, and write updated anti-burn-in correction data into the first non-volatile memory.

5. The timing controller according to claim 1, further comprising:

an overdrive circuit;

wherein the first non-volatile memory is further configured to store overdrive data; and wherein the overdrive circuit is configured to write a received fourth signal into the first non-volatile memory, read the overdrive data, process the overdrive data, and output processed overdrive data.

6. The timing controller according to claim 1, wherein the first non-volatile memory is further configured to buffer video data input from the external memory.

7. The timing controller according to claim 1, wherein the first non-volatile memory and the processor are integrated into a same bare die.

8. The timing controller according to claim 1, further comprising:

an input/output interface coupled to the first non-volatile memory, wherein the input/output interface is configured to perform writing or reading with the external memory.

9. The timing controller according to claim 1, wherein the first non-volatile memory comprises one or more of a flash memory, a magnetoresistive random access memory, a resistive random access memory, a phase-change random access memory, or a ferroelectric memory.

10. A display, comprising:

a display panel; and a timing controller, wherein the timing controller is configured to provide a timing control signal for the display panel, and the timing controller comprises:

a first non-volatile memory, configured to store software code for starting the timing controller;

a processor, configured to read the software code;

a demura correction circuit, configured to perform demura correction processing on a received first signal and output a processed first signal;

an anti-burn-in correction circuit, configured to perform anti-burn-in correction processing on a received second signal and output a processed second signal; and a timing control circuit, configured to process a received third signal and output the timing control signal;

wherein the first non-volatile memory is further configured to:

store the timing control signal; and buffer the timing control signal prior to the timing control signal being output to an external memory.

11. The display according to claim 10, further comprising:

a second non-volatile memory, wherein the second non-volatile memory is coupled to the timing controller.

12. An electronic device, comprising the display according to claim 10 and a housing, wherein the display is disposed in the housing.

13. A timing controller assembly, configured to be used in a display panel and provide a timing control signal for driving the display panel, wherein the timing controller assembly comprises:

a timing controller; and a third non-volatile memory, wherein the third non-volatile memory is disposed outside the timing controller;

wherein the timing controller comprises a processor and a first non-volatile memory, and the processor is directly coupled to the third non-volatile memory; and wherein the first non-volatile memory is configured to:

store software code for starting the timing controller;

store the timing control signal; and buffer the timing control signal prior to being output to an external memory.

14. The timing controller assembly according to claim 13, wherein the timing controller and the third non-volatile memory are two separate chips.

15. The timing controller assembly according to claim 13, wherein the timing controller further comprises a functional circuit, the functional circuit is configured to implement a function of the timing controller, and the functional circuit is directly coupled to the third non-volatile memory.

* * * * *